(12) United States Patent
Hill et al.

(10) Patent No.: US 10,606,006 B2
(45) Date of Patent: Mar. 31, 2020

(54) OPTICAL FIBER DISTRIBUTION SYSTEMS AND COMPONENTS

(71) Applicant: Clearfield, Inc., Minneapolis, MN (US)

(72) Inventors: John P. Hill, Andover, MN (US);
Walter E. Power, II, Jordan, MN (US);
Randy T. VanHorn, Princeton, MN (US)

(73) Assignee: Clearfield, Inc., Minneapolis, MN (US)

( * ) Notice: Subject to any disclaimer, the term of this patent is extended or adjusted under 35 U.S.C. 154(b) by 0 days.

(21) Appl. No.: 15/270,185

(22) Filed: Sep. 20, 2016

(65) Prior Publication Data
US 2018/0081135 A1    Mar. 22, 2018

(51) Int. Cl.
*G02B 6/44*    (2006.01)

(52) U.S. Cl.
CPC ......... *G02B 6/4439* (2013.01); *G02B 6/4444* (2013.01)

(58) Field of Classification Search
CPC .. G02B 6/4439; G02B 6/4452; G02B 6/4453; G02B 6/3897; G02B 6/444; G02B 6/4441; G02B 6/442; G02B 6/4444; H02G 15/08
USPC ......................... 385/134, 135, 138
See application file for complete search history.

(56) References Cited

U.S. PATENT DOCUMENTS

| | | | |
|---|---|---|---|
| 4,201,278 A | | 5/1980 | Balde |
| 4,312,563 A | * | 1/1982 | Mead ................... G02B 6/4428 385/76 |
| 4,690,491 A | * | 9/1987 | Stein ...................... H04B 10/27 398/58 |
| 5,024,503 A | * | 6/1991 | Gunn ................... G02B 6/4248 385/53 |
| 5,100,221 A | | 3/1992 | Carney et al. |
| 5,170,017 A | | 12/1992 | Stanevich et al. |
| 5,434,944 A | | 7/1995 | Kerry et al. |
| 5,490,229 A | | 2/1996 | Ghandeharizadeh et al. |
| 5,590,234 A | | 12/1996 | Pulido |

(Continued)

FOREIGN PATENT DOCUMENTS

| | | |
|---|---|---|
| FR | 2914753 A1 | 10/2008 |
| JP | H1032545 A | 2/1998 |
| WO | 2013149150 A1 | 10/2013 |

*Primary Examiner* — Robert Tavlykaev
(74) *Attorney, Agent, or Firm* — Pepper Hamilton LLP

(57) ABSTRACT

Fiber distribution systems, terminals and tap boxes that provide a reconfigurable and expandable system of hardened connections. A terminal may include at least one feeder port and a plurality of distribution ports, each of the at least one feeder port and the plurality of distribution ports being sealable ports configured to receive one of a duct and a connector, where the connector is configured to interface with a drop type cable. The terminal may include an expandable module configured to receive a splitter and a tap box having at least one sealable port configured to receive one of a duct or a connector. The tap box can include at least one fiber storage. The terminal may be configured to receive a fiber through the feeder port and to output a plurality of fibers through the plurality of distribution ports, at least one fiber of the plurality of fibers being received by a tap box mounted at a user location, through at least one sealed port, the tap box further comprising at least one slack fiber storage. Tap boxes may be configured to support different types of drop cables and connectors.

19 Claims, 20 Drawing Sheets

(56) References Cited

U.S. PATENT DOCUMENTS

| | | | |
|---|---|---|---|
| 5,778,125 A * | 7/1998 | Busse | G02B 6/3807 385/139 |
| 6,215,065 B1 * | 4/2001 | Cox | H02G 3/22 174/656 |
| 6,220,413 B1 | 4/2001 | Walters et al. | |
| 6,240,101 B1 | 5/2001 | Co et al. | |
| 6,539,160 B2 | 3/2003 | Battey et al. | |
| 6,668,127 B1 * | 12/2003 | Mahony | G02B 6/4451 385/135 |
| 6,792,191 B1 | 9/2004 | Clapp, Jr. et al. | |
| 6,856,747 B2 | 2/2005 | Cloud et al. | |
| 6,885,799 B2 | 4/2005 | Lee | |
| 6,933,441 B2 | 8/2005 | Fuller et al. | |
| 6,944,387 B2 | 9/2005 | Howell et al. | |
| 7,013,074 B2 | 3/2006 | Battey et al. | |
| 7,139,461 B2 | 11/2006 | Puetz et al. | |
| 7,142,764 B2 | 11/2006 | Allen et al. | |
| 7,333,708 B2 * | 2/2008 | Blackwell, Jr. | G02B 6/4441 385/134 |
| 7,346,253 B2 | 3/2008 | Bloodworth et al. | |
| 7,397,997 B2 | 7/2008 | Ferris et al. | |
| 7,406,242 B1 | 7/2008 | Braga | |
| 7,653,282 B2 | 1/2010 | Blackwell, Jr. et al. | |
| 7,697,811 B2 | 4/2010 | Murano et al. | |
| 7,717,625 B2 * | 5/2010 | Margolin | G02B 6/3825 385/100 |
| 7,751,672 B2 | 7/2010 | Smith et al. | |
| 7,885,505 B2 | 2/2011 | Zimmel | |
| RE42,258 E | 3/2011 | Thompson et al. | |
| 7,959,361 B2 | 6/2011 | Lu et al. | |
| 8,254,740 B2 | 8/2012 | Smith et al. | |
| 8,439,577 B2 * | 5/2013 | Jenkins | G02B 6/381 385/60 |
| 8,705,929 B2 | 4/2014 | Kowalczyk et al. | |
| 8,774,586 B2 * | 7/2014 | Kim | G02B 6/4444 385/135 |
| 8,798,427 B2 * | 8/2014 | Cox | G02B 6/3897 385/134 |
| 8,929,706 B2 | 1/2015 | Teymouri | |
| 9,039,293 B2 | 5/2015 | Hill et al. | |
| 9,069,151 B2 * | 6/2015 | Conner | G02B 6/4471 |
| 9,261,663 B2 | 2/2016 | Loeffelholz et al. | |
| 9,348,096 B2 | 5/2016 | Kmit et al. | |
| 9,400,364 B2 | 7/2016 | Hill et al. | |
| 2001/0022886 A1 * | 9/2001 | Cairns | G02B 6/4428 385/138 |
| 2005/0163432 A1 * | 7/2005 | Montena | G02B 6/3887 385/80 |
| 2007/0183732 A1 * | 8/2007 | Wittmeier | G02B 6/4442 385/135 |
| 2008/0013909 A1 | 1/2008 | Kostet et al. | |
| 2008/0069511 A1 * | 3/2008 | Blackwell, Jr. | G02B 6/4441 385/135 |
| 2010/0092129 A1 * | 4/2010 | Conner | G02B 6/4453 385/17 |
| 2011/0044599 A1 * | 2/2011 | Kowalczyk | G02B 6/4453 385/135 |
| 2011/0052132 A1 * | 3/2011 | Teymouri | G02B 6/4441 385/135 |
| 2011/0058785 A1 * | 3/2011 | Solheid | G02B 6/4442 385/135 |
| 2011/0211326 A1 | 9/2011 | Drouard et al. | |
| 2011/0211799 A1 | 9/2011 | Conner et al. | |
| 2011/0222831 A1 | 9/2011 | Cao et al. | |
| 2011/0305422 A1 * | 12/2011 | Thompson | G02B 6/4446 385/94 |
| 2012/0315001 A1 * | 12/2012 | Beck | G02B 6/3861 385/78 |
| 2013/0034336 A1 * | 2/2013 | Cassell | G02B 6/4466 385/135 |
| 2013/0101260 A1 * | 4/2013 | Foung | H01R 13/745 385/100 |
| 2014/0126873 A1 * | 5/2014 | Cooke | G02B 6/4471 385/139 |
| 2014/0133808 A1 * | 5/2014 | Hill | G02B 6/3826 385/81 |
| 2014/0140671 A1 * | 5/2014 | Islam | G02B 6/4471 385/101 |
| 2014/0147081 A1 * | 5/2014 | Jones | G02B 6/3825 385/78 |
| 2015/0055954 A1 * | 2/2015 | Gronvall | H04Q 11/0067 398/49 |
| 2015/0153532 A1 * | 6/2015 | Holmberg | G02B 6/3897 385/135 |
| 2015/0177473 A1 * | 6/2015 | Smith | G02B 6/4457 385/134 |
| 2015/0253528 A1 * | 9/2015 | Corbille | G02B 6/4454 385/135 |
| 2015/0378112 A1 | 12/2015 | Marcouiller et al. | |
| 2016/0018615 A1 * | 1/2016 | Czosnowski | G02B 6/4452 385/135 |
| 2016/0097909 A1 | 4/2016 | Loeffelholz et al. | |
| 2016/0202441 A1 * | 7/2016 | Claessens | G02B 6/3897 385/113 |
| 2016/0238810 A1 * | 8/2016 | Hubbard | G02B 6/4457 |
| 2016/0306124 A1 * | 10/2016 | Hill | G02B 6/3849 |
| 2017/0123175 A1 * | 5/2017 | Van Baelen | G02B 6/3897 |
| 2017/0153407 A1 * | 6/2017 | Van Baelen | G02B 6/3897 |

\* cited by examiner

OPTICAL FIBER DISTRIBUTION SYSTEMS AND COMPONENTS

TECHNICAL FIELD

The present disclosure relates generally to optical fiber distribution systems, and more specifically to systems, terminals and other components of fiber optic communication networks.

BACKGROUND

Data, voice, and other communication networks are increasingly using fiber optics to carry information. In a fiber optic network, each individual fiber is generally connected to both a source and a destination device. Additionally, along the fiber optic run between the source and the destination, various connections or couplings may be made on the optical fiber to adjust the length of the fiber or to provide termination connection ports for end users at which one or more fibers may be branched from a feed cable. In instances when the connection may be exposed to weather conditions, an essentially waterproof configuration of components is needed.

To interconnect the cables, various cable connector designs provide for low insertion loss and stability. Some example connectors may include, but are not limited to, SC, Dual LC, LC, ST and MPO connectors. In most of these designs, ferrules (one in each connector, or one in the connector and one in the apparatus or device), each containing an optical fiber end, are butted together end to end and light travels across the junction.

With the increasing desire for completely optical networks, "fiber to the premises" (FTTP) or "fiber to the home" (FTTH) systems are being developed to provide optical fibers that extend from the source to the site of the end-user. For this purpose, optical connection terminals are used for interconnection of the feed lines from the source with drop cables that extend to various user locations within a certain distance from the terminals. One example of an existing pre-determined FTTH network architecture is shown in FIG. 1. The network 100 includes a cabinet 102 that receives feeder cabling 104 from a central office 106, and provides multiple distribution cables 108. The feeder cable 104 may be a fiber cable having up to 288 fibers. Each of the distribution cables 108 is received by a respective terminal 110, which then provides multiple drop cables 112 that extend to user residences 114. In the network 100, each of the distribution cables 108 includes, for example, 8 fibers, and 8 drop cables emanate from each terminal 110. Single cable drop cabling 116 may also emanate from the cabinet 102, and serve, for example, a multi-dwelling unit 118.

Pre-determined networks may provide receptacles for fiber cable connection and distribution. However, pre-determined networks may not be flexible or easily customizable by service providers. As such, pre-determined designs may not provide cost-effective ways to match environmental needs and provide protection from the environmental elements. Further, as needs change, such as bandwidth requirements change, it may be difficult or costly to reconfigure the existing, pre-determined networks. Accordingly, there is a need for flexible, customizable fiber distribution systems that may be easily expanded or reconfigured.

SUMMARY

According to one aspect, there is provided a fiber distribution system comprising a terminal having at least one feeder port and a plurality of distribution ports, each of the at least one feeder port and the plurality of distribution ports being sealable ports configured to receive one of a duct and a connector, the connector configured to interface with a drop type cable, the terminal further comprising an expandable module configured to receive a splitter. The fiber distribution system further comprises a tap box configured to mount at a user location, the tap box having at least one sealable port configured to receive one of a duct and a connector, the tap box further comprising at least one fiber storage. The terminal may be configured to receive a fiber through the feeder port and to output a plurality of fibers through the plurality of distribution ports, at least one fiber of the plurality of fibers being received by the tap box through the sealable port of the tap box.

In some embodiments, the module may be configured to be replaceable and the terminal may be configured to receive a plurality of swappable modules. In some embodiments, the module may be configured to receive different types of splitters having different split ratios. In some embodiments, the module may be configured to receive any optical component, including any type of connector.

In some embodiments, the sealable ports may further include anti-rotation locking features. In some embodiments, the terminal may comprise a base and a cover.

In some embodiments, the tap box may comprise a plurality of slack fiber storages. The plurality of slack fiber storages may be stackable and configured to provide slack storage of about 600 feet. In some embodiments, the tap box may include removable bulkheads including at least one blank bulkhead configurable for receiving any type of connector. In some embodiments, the tap box may be configured to receive a plurality of different types of drop cables.

The fiber distribution system may further comprise a plurality of connectors configured to couple with the plurality of distribution ports of the terminal and with the at least one sealable port of the tap box. Each connector of the plurality of connectors may be configured to receive epoxy so as to provide a hardened connector. In various embodiments, the ducts may be configured to receive pushable fiber there through.

In some embodiments, the terminal may be a first terminal acting as a secondary feed source and the fiber distribution system may further comprise a second terminal configured to receive at least one fiber from the first terminal. In some embodiments, the fiber distribution system may comprise a plurality of terminals arranged in a daisy chained configuration.

According to another aspect, there is provided a fiber optic terminal comprising at least one feeder port, a plurality of distribution ports, each of the plurality of distribution ports being a sealable port configured to receive one of a duct and a connector configured to interface with a drop type cable, and an expandable module configured to receive a splitter. The terminal may be configured to receive a fiber through the feeder port and to output a plurality of fibers through the plurality of distribution ports. In some embodiments, the module may be configured to be replaceable and the terminal may be configured to receive a plurality of swappable modules. In some embodiments, the module may be configured to receive different types of splitters having different split ratios.

According to another aspect, there is provided a fiber optic tap box comprising a mount configured to attach the tap box to a user location, at least one sealable port configured to receive one of a duct and a connector, at least one port configured to provide a drop cable to the user location, and at least one slack fiber storage. In some embodiments, the tap box may be configured to provide a plurality of different types of drop cables through the at least one port.

The present disclosure is not limited in terms of the particular embodiments described in this application, which are intended as illustrations of various aspects. Many modifications and variations can be made without departing from its spirit and scope, as will be apparent to those skilled in the art.

DETAILED DESCRIPTION

Aspects of the present disclosure provide optical fiber distribution systems and components that are customizable to cost-effectively match environmental conditions and service provider needs. Embodiments provide flexible, customizable fiber distribution systems that may be easily expanded or reconfigured.

Various embodiments of optical fiber distribution systems, terminals, enclosures, connectors and drop cable options disclosed herein may simplify fiber deployment, reduce initial capital expenditures and minimize long-term operational costs. Embodiments may provide next generation hardened optical fiber terminals, test access points with deployment reels and various drop cable options. Embodiments disclosed herein are designed such that service provider or providers have the freedom of choice to match drop cable technology with the needs of their environment and first-cost priorities.

Aspects of the present disclosure provide optical fiber distribution multi point drop systems. Embodiments allow fiber signals to pass through cables and connectors and into one or more distribution terminals, and then into one or more tap boxes for providing fiber to the home, apartment, or multi-dwelling unit (MDU).

Figure 1:
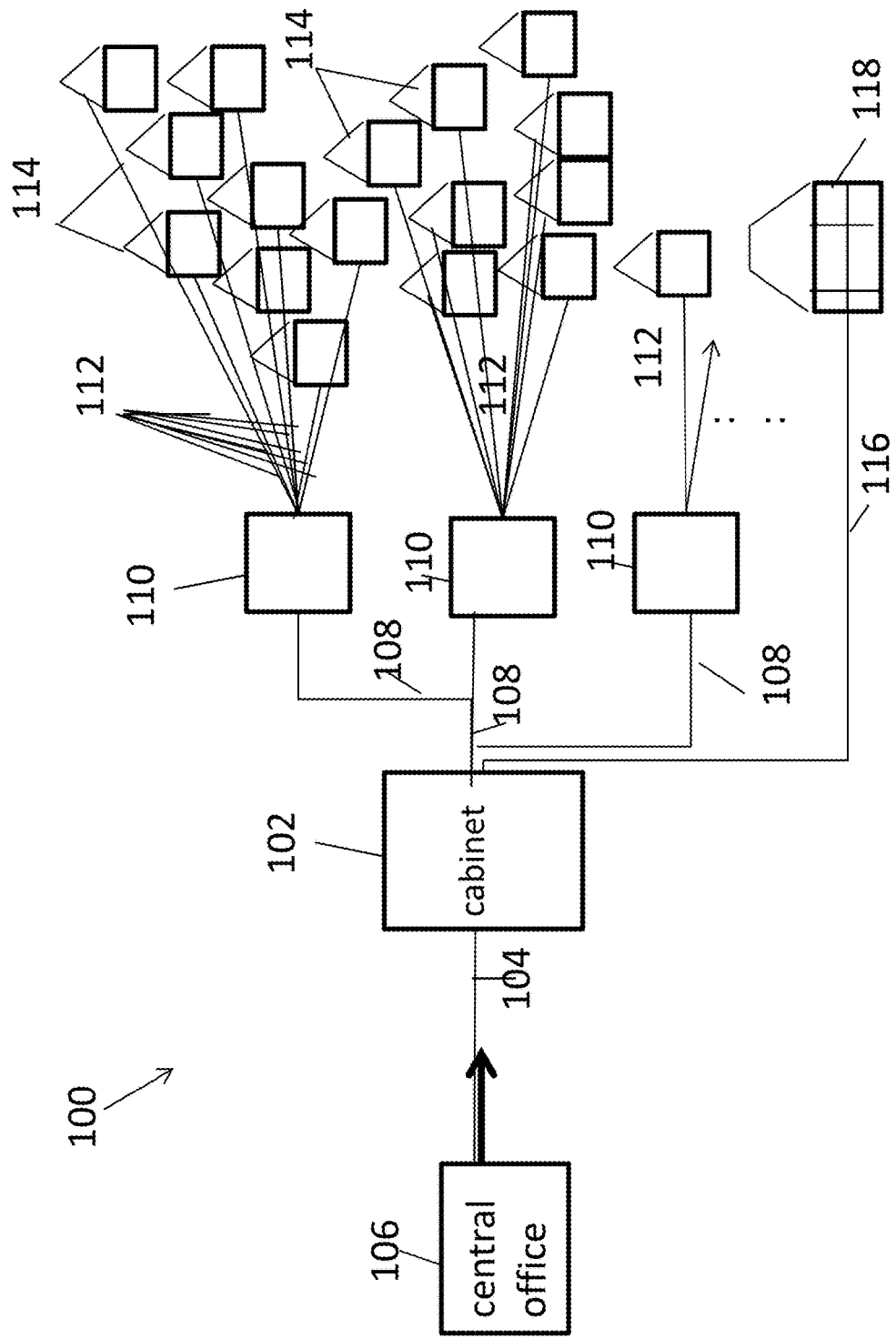
FIG. 1 is a schematic diagram of an existing FTTH network.
Figure 2:
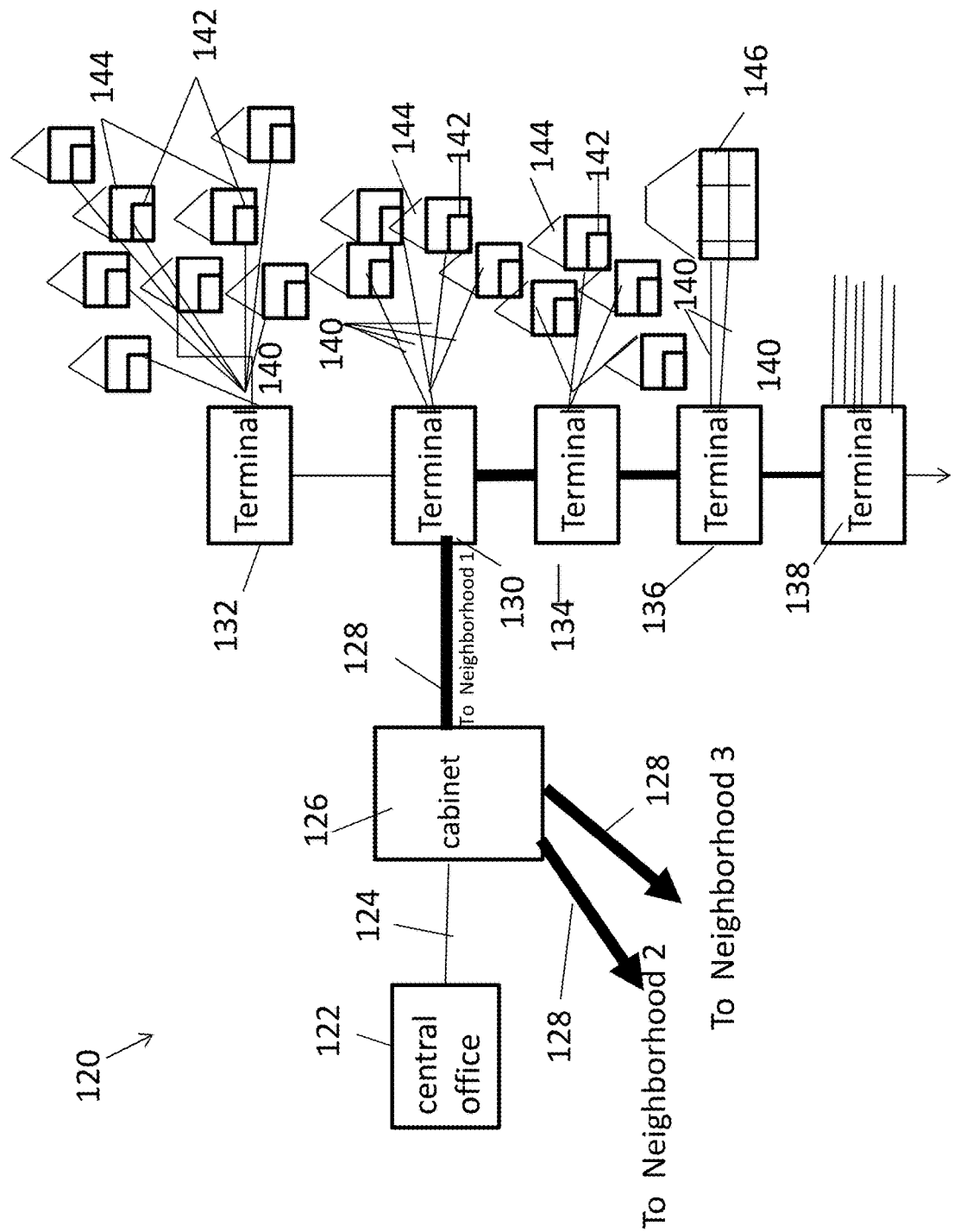
FIG. 2 is a schematic diagram of one embodiment of an optical fiber distribution system configured according to aspects of the present disclosure.

FIG. 2 shows one embodiment of an optical fiber distribution multi-point drop system 120 configured according to aspects of the present disclosure. A central office 122 provides a feeder cable 124 to a cabinet or primary feed location 126. In this embodiment, the feeder cable 124 includes 288 fibers. In other embodiments, other types of feeder cables may be used, having a different number of fibers. The cabinet 126 is configured as a primary feed, receiving the feeder cable 124 and outputting a plurality of distribution cables 128. The distribution cables may service different locations, such as houses or neighborhoods. In this embodiment, each distribution cable includes 12 fibers. In other embodiments, a different number of fibers may be provided.

The optical fiber distribution system 120 includes a plurality of terminals configured according to aspects of the present disclosure. Each terminal may be configured differently and customized according to service provider and customer needs. In this embodiment, terminal 130 is configured to receive a distribution cable 128. Terminal 130 outputs a single fiber to another terminal 132. Terminal 130 is also equipped with a 1×4 splitter inside, and outputs four drop cables 140, each of which is received by a respective tap box 142 located at end user premises 144, such as the side of a house. Terminal 130 acts as a secondary feed by providing a single fiber output that feeds another terminal 132. Thus, terminal 132 is not fed from the primary feed or cabinet 126, but rather from another terminal 130 configured as a secondary feed. Terminal 132 is configured to include a 1×8 splitter inside, thereby providing 8 drop cables to tap boxes 142 located at user premises 144.

The terminals may be indexed, also referred to as daisy chained, so as to provide drop cables at successive locations along a route. For example, terminals 130, 134, 136 and 138 are daisy chained. The 10 remaining fibers at terminal 130 are propagated and input to a terminal 134. A single fiber is output at terminal 134, with the remaining 9 fibers being propagated and input to the next terminal 136. Again, a single fiber is output at terminal 136, with the remaining 8 fibers being propagated and input to the next terminal 138, and so on, until no active fibers remain. Each of the terminals that are daisy chained may be customized. For example, terminal 134 includes a 1×4 splitter, terminal 136 includes a 1×2 splitter, and terminal 138 includes a 1×6 splitter. Tap boxes 142 may be attached to various types of user locations, such as residences 144 or multi-dwelling units 146.

The embodiment shown in FIG. 2 is one example of an optical fiber distribution system disclosed herein. Other optical fiber distribution systems may be configured differently, for example using a different number of terminals, each of which is configured differently.

Figure 3:
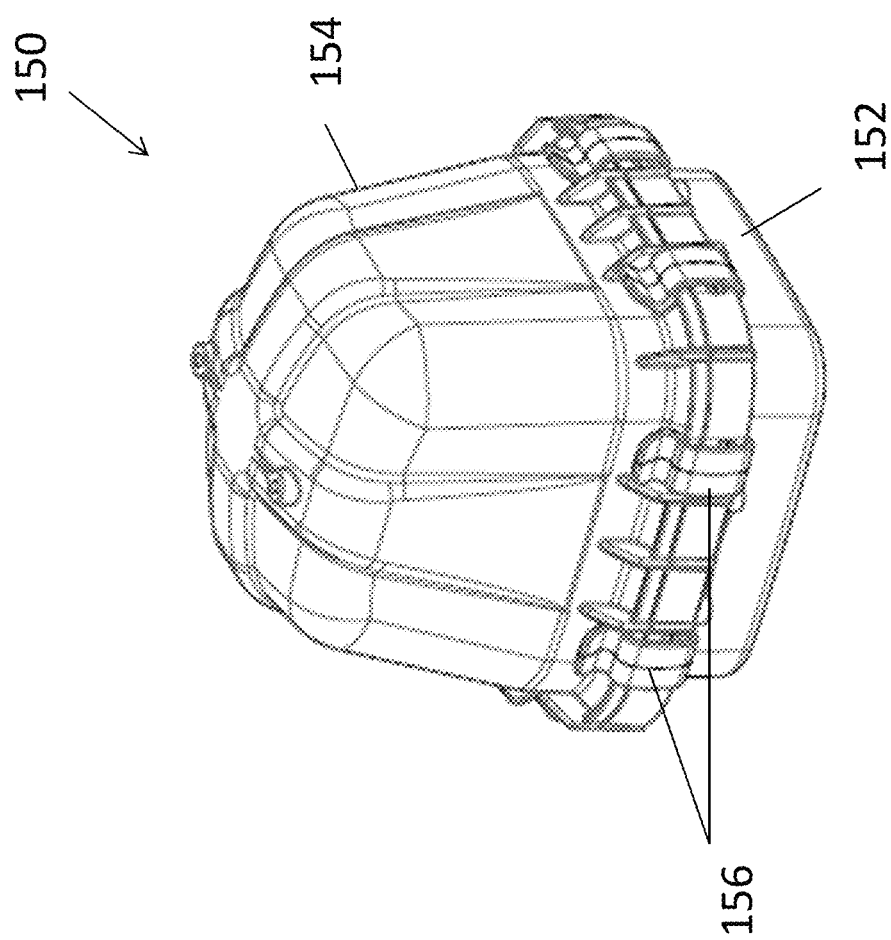
FIG. 3 is a perspective view of one embodiment of a terminal configured according to aspects of the present disclosure.

FIG. 3 is a perspective view of one embodiment of a terminal 150 configured according to aspects of the present disclosure. The terminal 150 includes a base 152 and a cover 154. A plurality of latches 156 are used to lock the cover to the base. Embodiments are not limited to latching locks. In other embodiments, other types of locking mechanisms may be used.

Figure 4:
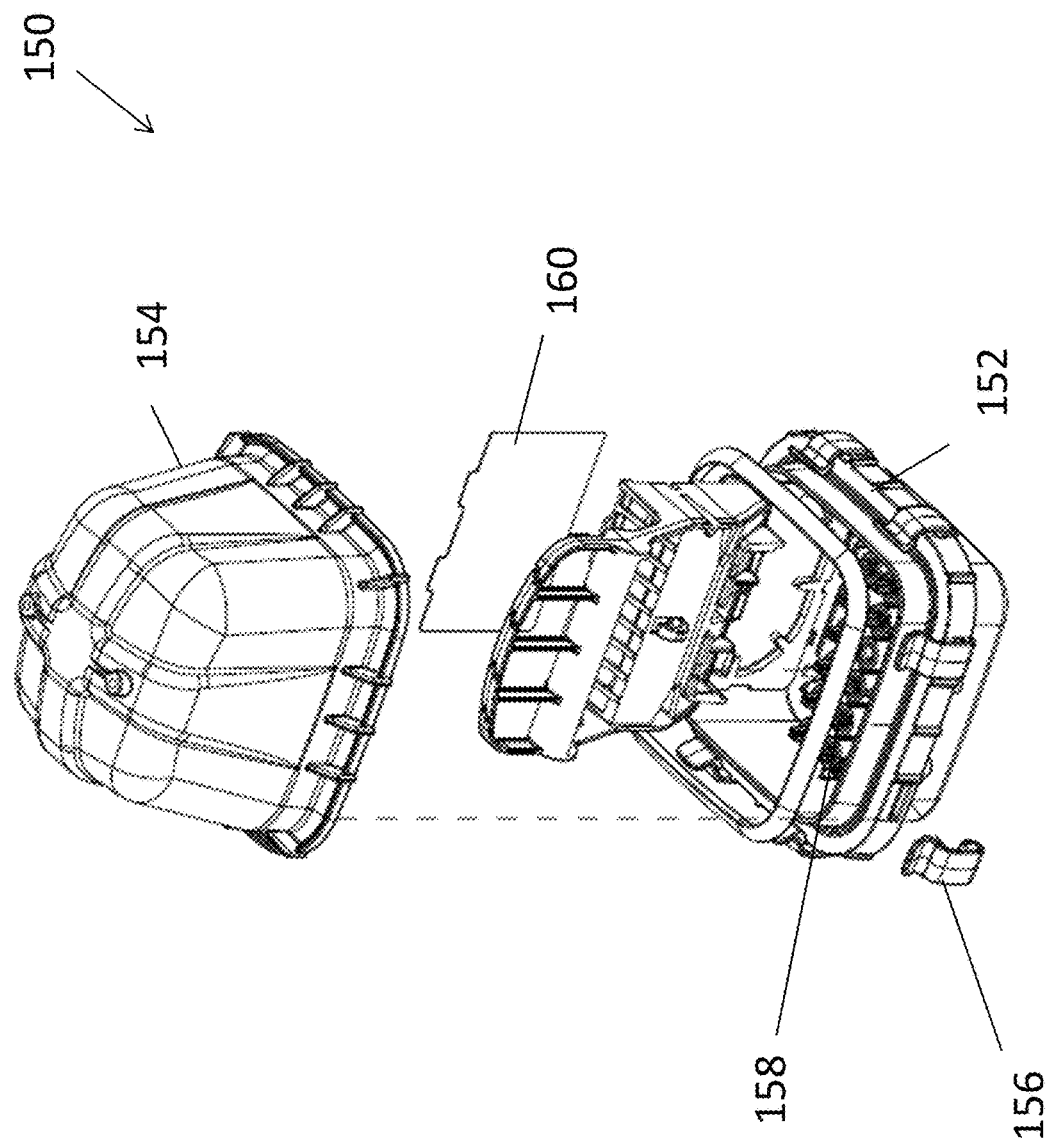
FIG. 4 is a perspective, partially disassembled view of the terminal of FIG. 3 according to aspects of the present disclosure.

FIG. 4 is a perspective, partially disassembled view of the terminal 150, showing a plurality of ports 158 disposed within the base 152. The terminal 150 also includes a mounting plate 160 to facilitate attachment of the terminal to a mounting surface (not shown).

Figure 5:
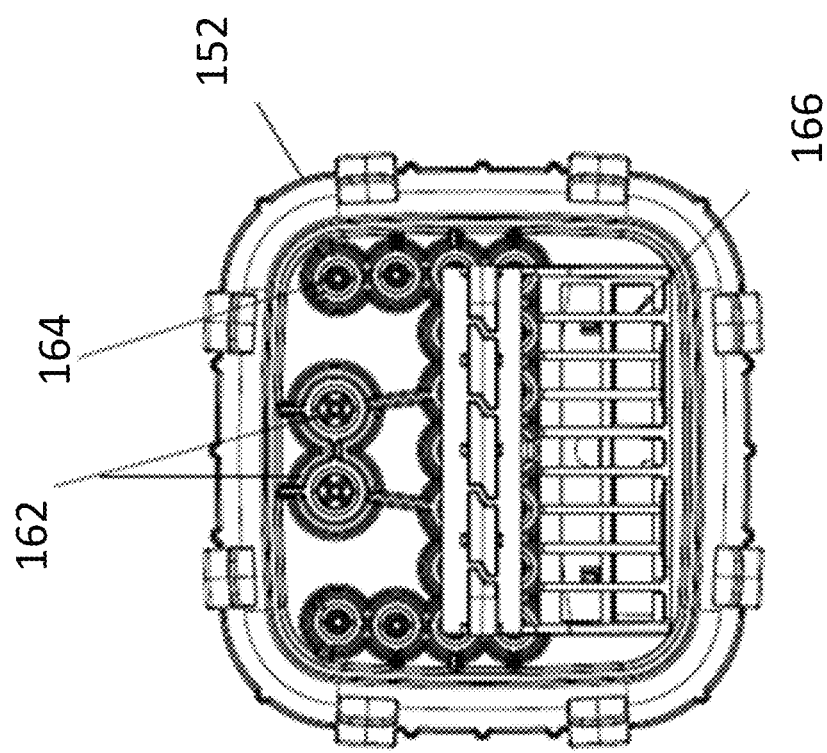
FIG. 5 is a top view of the inside of the terminal of FIG. 3 according to aspects of the present disclosure.

FIG. 5 is a top view of the inside of the base 152, showing a plurality of ports 162 and 164. The two larger ports are feeder ports 162. Each feeder port 162 is a 14 mm sealed duct port with a breakoff cap and anti-rotation locking feature. The 18 smaller ports are distribution ports 164. Each distribution port 164 is a 10 mm sealed duct port with a breakoff cap and anti-rotation locking feature. Although this embodiment shows two feeder ports 162 and 18 distribution ports 164, other embodiments may include a different number of each type of port. The ports 162 and the ports 164 can be sealed. The ports 162 and 164 can include knock-out covers that can be removed once a port 162 and 164 is used. The ports may also be arranged in a different configuration than the embodiment shown in FIG. 5. The terminal 150 further includes a module or cassette 166. In this example, the module or cassette 166 is an 18-port front feed cassette with splice and fiber management area. The module 166 is configured to terminate the fiber that runs into the terminal. Other embodiments may include other types or configurations of modules.

Figure 6:
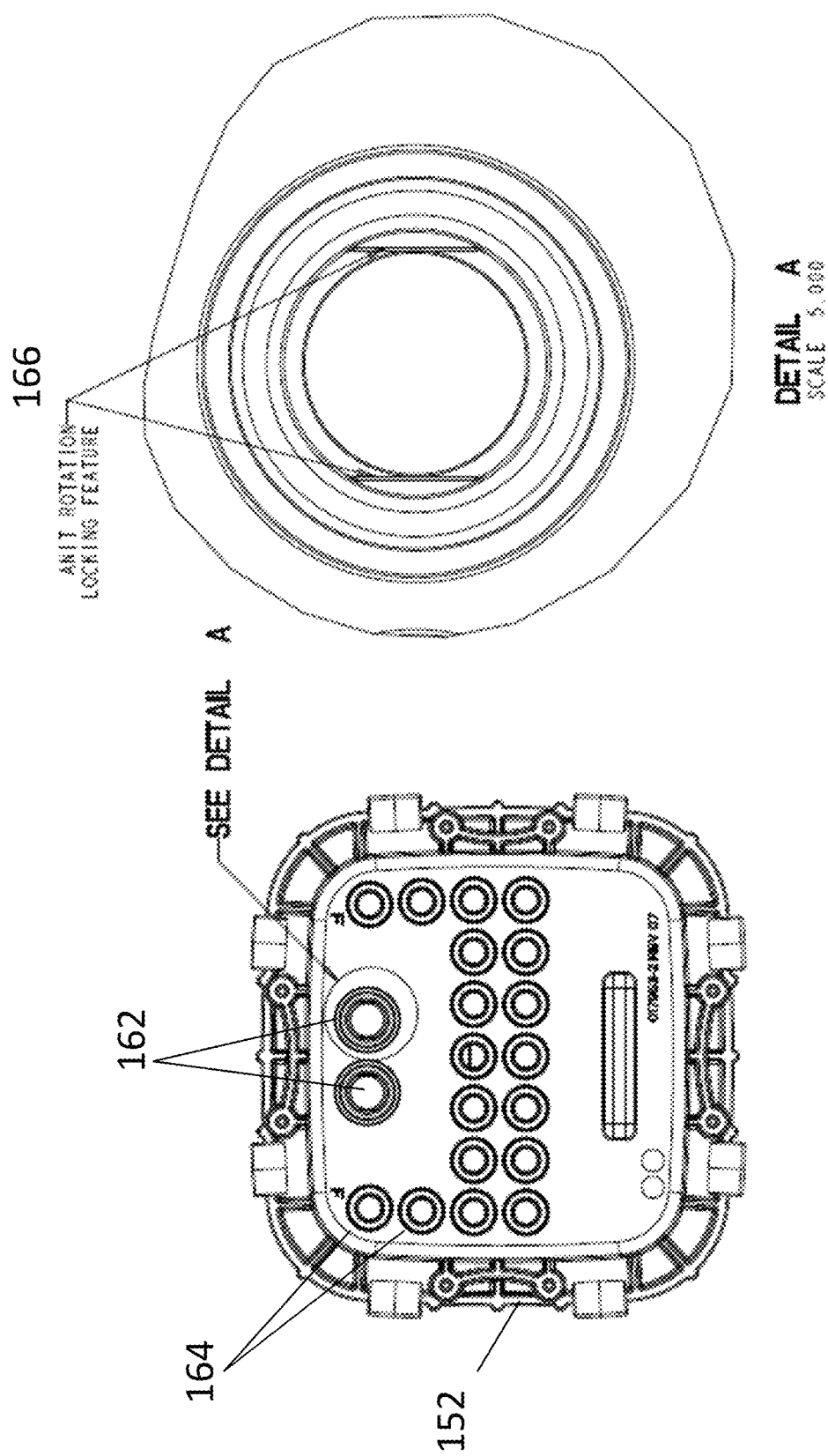
FIG. 6 is a bottom view of the terminal of FIG. 3 according to aspects of the present disclosure.

FIG. 6 is a bottom view of the base 152, showing the feeder ports 162 and the distribution ports 164. A detailed view (Detail A) of one of the feeder ports 162 shows an anti-rotation locking feature 166. Similarly, the distribution ports may include anti-rotation locking features according to aspects of the present disclosure.

Figure 7:
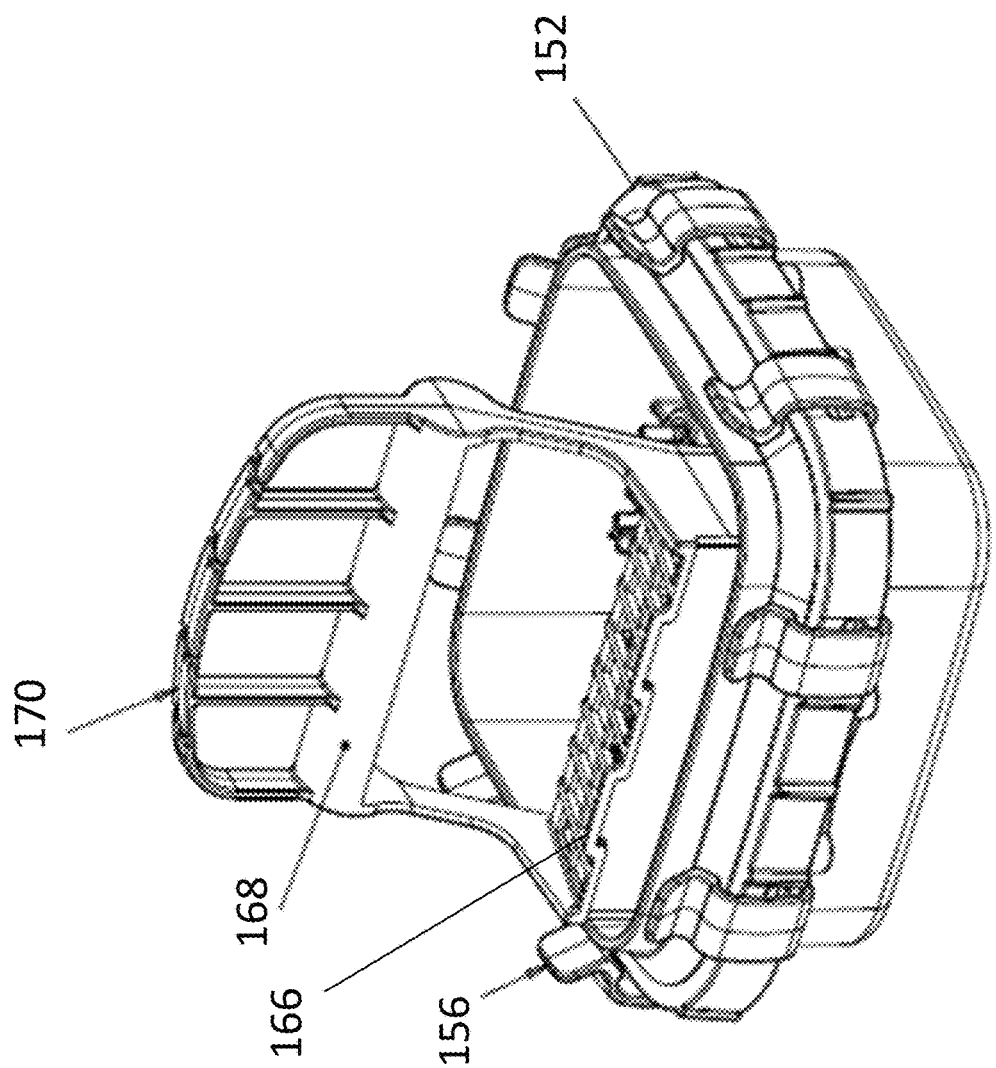
FIG. 7 is a perspective view of the base of the terminal of FIG. 3 according to aspects of the present disclosure.

FIG. 7 is a perspective view of the base 152, further illustrating a radius protection element 168 and fiber containment fingers 170. In this embodiment, various components and features are disposed within the base portion of the terminal. In other embodiments, various components such as the radius protection element 168 and the fiber containment fingers 170 may be disposed, for example, in the cover portion of the terminal.

Figure 8:
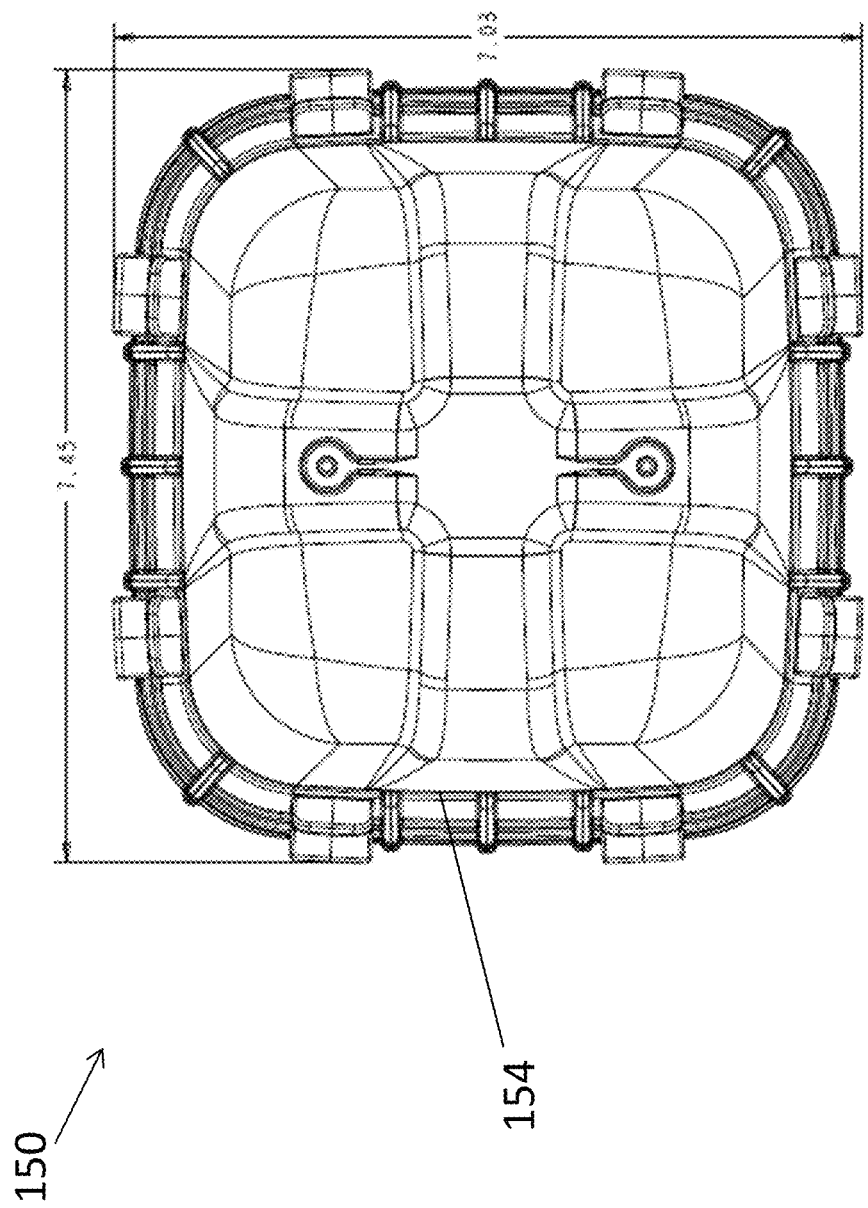
FIG. 8 is a top view of the terminal of FIG. 3 according to aspects of the present disclosure.
Figure 9:
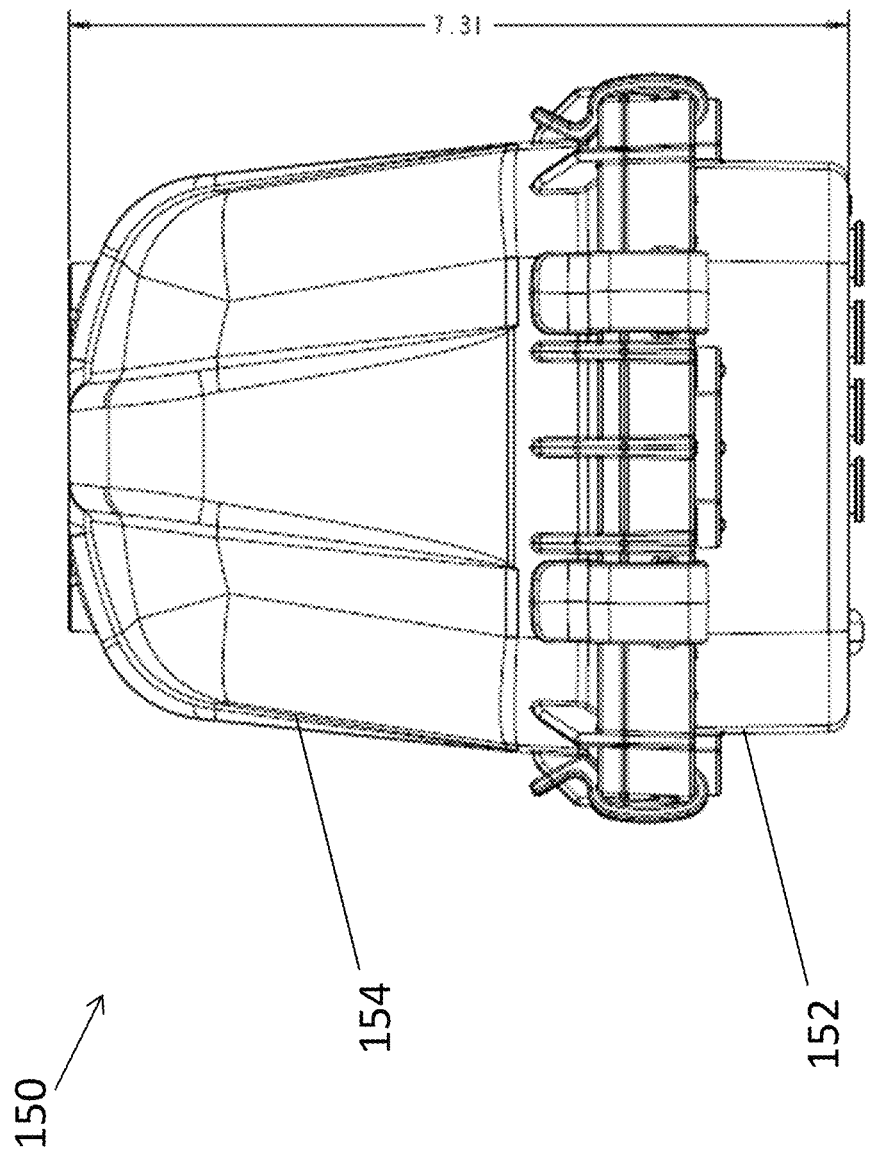
FIG. 9 is a side view of the terminal of FIG. 3 according to aspects of the present disclosure.

FIG. 8 is a top view of the terminal 150, showing exemplary dimensions of the terminal. In this example, the terminal is shaped approximately as a square, having dimensions of about 7.45 inches by about 7.03 inches. In other embodiments, the terminals may have different sizes, and may be shaped differently than those illustrated herein. FIG. 9 is a side view of the terminal 150, showing that the terminal has a height of about 7.31 inches. In other embodiments, the terminal may have a different height, and may be shaped differently than those illustrated herein. For example, in some embodiments, the terminal 150 may have dimensions that are substantially smaller than the 7 inches in height and width.

Figure 10:
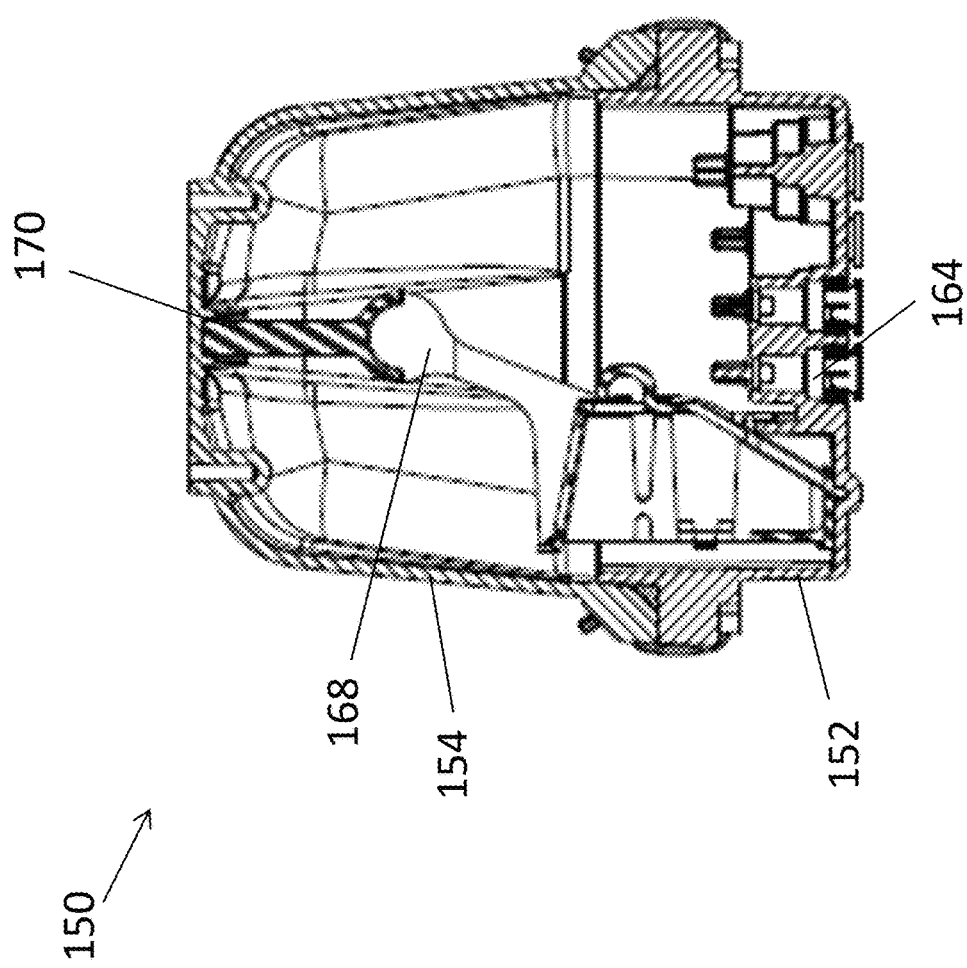
FIG. 10 is a cross-sectional side view of the terminal of FIG. 3 according to aspects of the present disclosure.

FIG. 10 is a cross-sectional side view of the terminal 150, showing the cover 154 and the base 152, the distribution ports 164, the radius protection element 168 and fiber containment fingers 170.

Embodiments of terminals disclosed herein, such as terminal 150, may be used in optical fiber distribution systems, such as the system 120 of FIG. 2. For example, a feeder port of terminal 130 may be configured to receive the feeder cable 128 having 12 fibers into the terminal. The terminal may be configured to allow connecting the fibers to the cassette or module within the terminal. Drop cables may be supplied to user locations through one or more distribution ports. Various user locations may be equipped with tap boxes configured to receive one or more fibers and to connect them to the user locations, while also storing slack.

Terminals disclosed herein improve the customer application and craft experience by providing an access terminal capable of multiple drops, for example 16 drops, multiple feeder ports, for example two feeder ports for mid-span and daisy chaining scenarios, along with a fully protected and restorable pathway from the terminal to a tap box using a modular and flexible approach that scales across the application environment.

Utilizing the technology that couples ducts in a restoration or transitional scenario, terminals disclosed herein may provide 16 drops ports along with two feeder ports using a "half cartridge coupler" that provides an air/water tight connection, which reduces overall costs by eliminating the need for expensive proprietary connectors. Ducts may be brought to the terminal, trimmed to length and pushed into the half cartridge coupler of the terminal, completing the protected pathway. Fiber may then be pulled or pushed from the customer premise to the "inside" of the terminal, where connector assembly is completed and mated to a removable module or cassette that has been configured to the customer's application. Fiber is not exposed as it enters the flower pot, vault, or pedestal where the terminal is stored but rather is delivered directly to the terminal, reducing risk of accidental damage to the fiber. The craft-sensitive nature of properly assembling a hardened connector is eliminated. Re-entering the terminal simply involves removing the cover. The sealed ports entering the terminal are never compromised.

In some embodiments, the increased port count to 16 allows for more distributed split options including 4, 8 and 16 way splitters (SC) housed and terminated into the terminal cassette. Hot-swappability of the module or cassette allows for future reconfiguration or restoration of the module or cassette without having to replace the entire terminal. Plug-and-play scenarios using Clearfield's FieldShield Pushable MPO Connectors allow for single connector connectivity up to 16 ports when configured with an MPO to a 16 SC cassette. In some embodiments, the terminal may be optimized for customer specified daisy-chaining applications utilizing optical components and/or MTP/MPO. In various embodiments, the cassette may be configured to provide splicing capabilities for restoration scenarios or for that rare occasion where an unplanned terminal must be placed in lieu of a factory terminated/tested terminal.

Various embodiments of terminals disclosed herein may be configured according to various mounting options. A first mounting option is below grade. The terminal may be placed in a flower pot, pull box, small or large vault and is treated similar to a splice case. Because ducts are terminated directly into the terminal providing a water-tight, gas-tight seal, along with 100 lbs. of pullout force, the terminal, fully or partially loaded, can be placed directly into a chosen housing providing the number of ducts and associated slack. As all ducts are terminated into the terminal, it is recommended that duct slack that allows for removal of the terminal into sufficient access and working position be applied. Whether that be directly over the access point or pulled into a conditioned environment like a splice trailer, the terminal adjusts to the customer's craft practices. If a secured placement into this environment is desired (off the bottom of the closure and off of cables/ducts), the mounting options for the above grade pedestal mounted options can be applied. Access to the terminal is no different than a splice case in that the technician will pull the terminal out of the vault/flower pot and access the terminal per company practices. The cover of the terminal may be held on with 8 spring clips that can be disengaged using fingers but provide the necessary compression force to fully seat the cover against the silicon seal on the base of the terminal when all 8 clips are engaged.

A second mounting option is a pedestal mount or a pole mount. In one embodiment; the terminal may include an L-bracket with a locking wheel-nut that s configured to attach to the cover of the terminal, providing the flexibility to mount the terminal into any pedestal or pole while providing quick and easy access to the terminal cassette for adding/removing/troubleshooting service or adding additional ducts.

A third mounting option is that the terminal may be strand mounted for aerial applications for plug-and-play applications utilizing a straight F1/F2 hub and spoke approach or for daisy-chaining applications with the use of splitters and MTP/MPO connectivity. Some of these configurations can provide greater flexibility, increased port capacity, and lower customer cost through labor savings and reduced complexity to deploy.

According to another aspect disclosed herein, when fiber is already deployed at the network access point, embodiments of the terminal may be configured as patch and splice with an unterminated input leg. In one example, splicing the incoming fiber to the input leg of the splitter may provide service for up to eight customers. For customers who are experiencing fiber constraints, optical splitters with pre-terminated drop ports may be deployed to split the signal and maximize network performance. The physical architecture and placement of pathways remain largely the same when using the terminal to service active and distributed split business class services. Flexibility in configuration provides maximum scalability across multiple service classes.

In some embodiments, the terminal may include, for example, 1×2, dual 1×2, 1×4, dual 1×4, 1×8, dual 1×8 and 1×16 splitters pre-terminated to both the input and output adapter ports. As a result, the terminal may be fed from the distribution point with a single SC pushable assembly and distribute up to sixteen SC pushable drops without any additional splicing.

Various embodiments of terminals disclosed herein are made of black UV resistant thermoplastic designed to resist corrosion. Environmentally sealed terminals provide maximum reliability and durability n the harshest OSP environments. Flat-SC drop connectors may provide bend-limiting relief protection and watertight seal for flat drop, OSP and other types of cable.

In some embodiments, the terminal may be configured to accept up to 16 10 mm distribution ports (for example, for 10 mm FieldShield Microduct or FieldShield Flat-SC). In some embodiments, the terminal may accept up to two 14 mm feeder ports (for example, for 14 mm Field Shield Microduct). Embodiments may have a compact sealed design, thereby allowing for placement above or below grade. Patch and splice configurations may accept both flat drop and OSP cable types. Flexibility in configuration provides maximum scalability across multiple services classes. In some embodiments, field-assembled Field Shield Pushable drop cables reduce installation time and labor costs by removing expensive splicing labor from the terminal to customer premise. Pre-terminated factory polished feeder and drop cables improve network operability across multiple network access points.

In one embodiment, the terminal may have dimensions of about 7.14 inches (width) by about 6.74 inches (depth) by about 7.31 inches (height). In some embodiments, the terminal may be made of black UV resistant thermoplastic material. In various embodiments, the terminal may be mounted below grade, such as in a flower pot or a vault. In other embodiments, the terminal may be mounted above grade, such as in a cabinet, pedestal, pole mount or an aerial/strand mount. In various embodiments, the terminal may not be configured to provide for internal slack storage inside the terminal. Instead, slack fiber storage may be provided at customer locations, such as within tap boxes mounted at customer locations as described in further detail below. External slack storage is virtually unlimited, and depends on vault size or mounting application.

In some embodiments, the feeder ports of the terminal may comprise two 14 mm half cartridges, and distribution ports of the terminal may comprise sixteen 10 mm half cartridges. Terminals disclosed herein may be configured to provide various types of connectors, for example SC/APC and SC/UPC for the distribution and feeder ports.

According to another aspect disclosed herein, for service providers looking to remove splicing from small count fiber deployments, the terminal may be configured to provide a hardened MPO OSP plug-and-play solution. Once deployed in an industry standard OSP enclosure, a MPO to MPO patch cord or MPO to SC or LC connector breakout feeder assembly is pulled back to the fiber distribution point and plugged into an available network port. Microducts may be routed from the terminal to the customer premise and hardened pushable drop cables may be installed once service turn-up is required.

In some embodiments, the terminal may include up to sixteen SC pre-connectorized distribution ports terminated to an MPO breakout feeder input port. By simplifying the patch and splice configuration to a plug-and-play solution, deployment is built around a single terminal part number and matching MPO feeder cables built to specific application or standardized lengths. Features described above in relation with other embodiments of terminals may also be applied to embodiments of terminals configured with MPO breakout feeder assembly.

According to another aspect disclosed herein, terminals may be configured in a patch and splice configuration. Whether distribution cables are passing through a serving area, fiber is being handed off via a mid-span and continuing on, or current architecture is being upgraded to push fiber further into the network with FTTH build outs, in some embodiments the terminal may be configured to accept the "hand-off" of fiber and distribute up to sixteen service drops. A route path is either direct buried or aerially established to the subscriber with microducts or Flat-SC drop connect. In one embodiment using the microduct solution, a pre-terminated pushable drop cable, terminated with a pushable connector on one end and industry standard connector on the other, may be pushed or pulled from or to the terminal, mated and secured with an industry standard SC connector.

Similar to a cassette, the terminal may include a user defined splice option to allow push or pull capability from or to the terminal. The terminal may be custom configured by the service provider to meet the exact configuration for every individual service area deployment. The terminal may be configured as patch and splice with a one/half meter 12- or 24-fiber 250 μm ribbon breakout and accept up to sixteen 40 mm individual splice sleeves. Features described above in relation with other embodiments of terminals may also be applied to embodiments of terminals having a patch and splice configuration.

According to another aspect disclosed herein, terminals may be configured in a patch only configuration. From the splitter in an active cabinet or fiber distribution hub, distribution cables may be transported into a consolidated splice point that serves multiple terminals. The pathway from the splice point to the terminal access point may be established, for example, with a FieldShield Microduct or Flat-SC. In some embodiments using the microduct solution, a pre-terminated Field Shield Pushable Drop Cable, terminated with a pushable connector on one end and industry standard connector on the other, is pushed or pulled from or to the terminal, mated and secured with an industry standard SC connector. Once established, a patch only terminal may be placed in the housing of choice at the test access point (TAP) and the pre-determined length of FieldShield Optical Cable may be pushed or pulled back to the consolidated splice point.

In some embodiments, the terminal may be configured to provide up to sixteen SC pre-connectorized drop ports with a FieldShield. Pushable Feeder Cable, flat drop cable, OSP cable, or other type of cable, built to customer specified lengths. The terminal may be configured with a factory-terminated FieldShield Optical Cable, from two to sixteen SC ports, for the feeder configuration that may be pushed or pulled through Field Shield Microduct to a consolidated splice point in the serving area. Distribution ports may be sealed with water tight caps on the inside of the base, until service turn-up is required. Features described above in relation with other embodiments of terminals may also be applied to embodiments of terminals having a patch only configuration.

Various embodiments of terminals disclosed herein provide flexible and hardened terminals. Various embodiments are configured to support various different types of drops and microducts, including those supplied by Clearfield. The configuration flexibility supports multitude of application environments. Various embodiments may serve as terminal access points in a centralized split architecture and provide segmented or distributed functionality of that same centralized splitter cabinet at a lower cost per home connected. Various embodiments may provide plug-and-play readiness, and may flex and scale to meet the requirement foundation for any network design.

In some embodiments, the terminal may be configured for aerial environments. Aerial terminals may be configured to allow for mid-spanning up to a 144-count optical fiber for fiber connectivity with up to twelve drops from the terminal to the subscriber. Without commanding a price premium over a simple splice case that has often been used to provide the splicing and connectivity required for this application, aerial terminals also provide interconnect connectivity. In addition, the aerial terminal may provide the service provider a choice of drop cable media.

An aerial terminal allows for aerial/strand mount fiber deployment within the network architecture. Designed for easy craft accessibility, embodiments of an aerial terminal may have a removable hinged cover with four side entrance cable access ports. Some embodiments of aerial terminal may have 12 individual drops terminated to SC connectors. Various embodiments of the aerial terminal may be configured to accept various drop options, for example all of the FieldShield drop options, as well as other cable drop options.

Various embodiments of aerial terminals may be optimized for use with FieldShield Microduct and Pushable Fiber, as well as FieldShield flat drop cable assemblies. Embodiments of the aerial terminal may be made of black UV resistant thermoplastic designed to resist corrosion. Free breathing aerial terminals provides durability and protection in the OSP environments. In some embodiments, 10 mm half cartridges provide duct/fiber protection as well as strain relief for drop cables.

Various embodiments of the terminal provides the terminal access point in a centralized split architecture or replaces and provides segmented or distributed functionality of a centralized splitter cabinet at a lower cost per home connected. Depending on anticipated take rates, competitive environment, make-ready challenges, and the physical construction environment, the same terminal having plug-and-play readiness may flex and scale to meet the requirement foundation for any network design.

Various embodiments of terminals may provide 16 ports, the highest density in marketplace. Various embodiments may be configured to provide SC, MPO/MPT or LC connectors. Terminals may include ducts or microducts that minimize failure points by creating a water tight pathway through the duct or utilizing flat drop. Terminals are not restricted to proprietary connectors.

In various embodiments, the terminal may include a cartridge configured to provide flexible plug and play in addition to upgrade capabilities, such as when future bandwidth requirements change. Plug and play connectivity not only provides multiple interface options at the cartridge but also provides the ability to swap out the cartridge in minimal time using the same drop cable connectivity already there and without the added expense of another terminal.

The terminals may be configured to allow various applications. In one embodiment, the terminal may be configured for daisy chained applications. This configuration provides terminal and drop connectivity while providing signal advancement to the next terminal. In various embodiments, the terminals may be configured to support MPO, SC and LC connectors. Terminals may also be configured for coarse and dense wave division multiplexing. In some embodiments, terminals may be configured for distributed split applications, and may include different types of splitters, such as 1×4, 1×8, 1×16 PLC splitters, and may be arranged in stub configurations.

Various embodiments of the terminal may support, for example, 4, 8, 12, and 16 fiber MPO to SC/LC. Multifiber cables may be routed from a fiber distribution hub (FDH) to various embodiments of terminals disclosed herein (e.g., MPO/MPO from FDH to terminal using Fieldshield Multifiber). Various embodiments may have stubbed configurations when consolidated splice points are used (MPO/blunt from FDH to consolidated splice point using Fieldshield Multifiber, and Blunt/MPO from terminal to consolidated splice point using Fieldshield Multifiber).

Accordingly, as described herein, various embodiments of terminals disclosed herein may be reconfigurable and expandable. For example, terminals may be configured to allow adding optical components, splitters, or CWDM. Terminals may feature hot swappable modules and feature plug and play functionality.

The tap box provides a secure demarcation point between the service provider network and multiple customer environments such as a single family unit (SFU), multi-dwelling unit (MDU) or business. The tap box gives the network service provider both the ability to store slack fiber as well as provide a test access point (TAP) for ease of deployment and network maintenance without needing to have access to the interior of the customer premise. Embodiments of the tap box may be configured to accept a variety of drop cables, which allows the tap box to be integrated into any network architecture and deployment.

Drop cable choices are traditionally limited to OSP cables with little to no hardened connector options, making it difficult to deploy cost-effectively. Low cost of flat drop cables has led to their popularity. While they satisfy direct-buried requirements, they require a costly and bulky connector when hardened connectivity is required. Further, they introduce slack storage challenges that are either unsightly or costly to hide when "exact" engineered lengths cannot be accomplished. While flat drop material cost is generally the lowest on the market, the lack of restoration, aesthetic feel and hidden Total Cost of Ownership (TCO) factors make this choice challenging. Accordingly, various embodiments disclosed herein offer multiple drop options, giving the customer a choice for the drop cable that best suits the top priority of their build.

Further, various embodiments of terminals and tap boxes disclosed herein are configured to allow the use of ducts or microducts, such as Clearfield's FieldShield Microduct, coupled with pushable fiber. The ducts are configured to provide protection to the fiber. The ducts and pushable fiber separate the physical fiber protection of a cable from the actual fiber itself. This allows for a pathway to be established and options to be deployed on that pathway that could be upgraded in the future or restored if the pathway was cut, with minimal costs and disturbance to the environment.

Embodiments of tap boxes disclosed herein provide one of the smallest test access point enclosures in the industry while providing a seamless interconnect between varying drop technologies. Some embodiments may be configured to house two FieldShield Deploy reels of up to 300 ft. of StrongFiber or 50 ft. of 3 mm FLEXdrop, or any other type of cable, saving on pre-engineering and allows 10:1 space savings at the demark.

Embodiments of the tap boxes disclosed herein have the smallest demarcation footprint in the industry. In some embodiments, the tap box may be configured to provide up to about 600 feet of slack fiber storage (300 feet per reel). This eliminates the need for having a large, bulky and unsightly box on the side of an SFU, MDU or business location, to store excess or unused fiber.

Various embodiments of tap boxes may provide multiple drop wheel and feeder options. Embodiments may include multiple mounting plates to provide maximum drop flexibility. Cable assemblies may be placed and brought to a tap box. In some embodiments, connectors may be snapped into place on the bottom of the tap box, providing an air/water tight connection.

Figure 11:
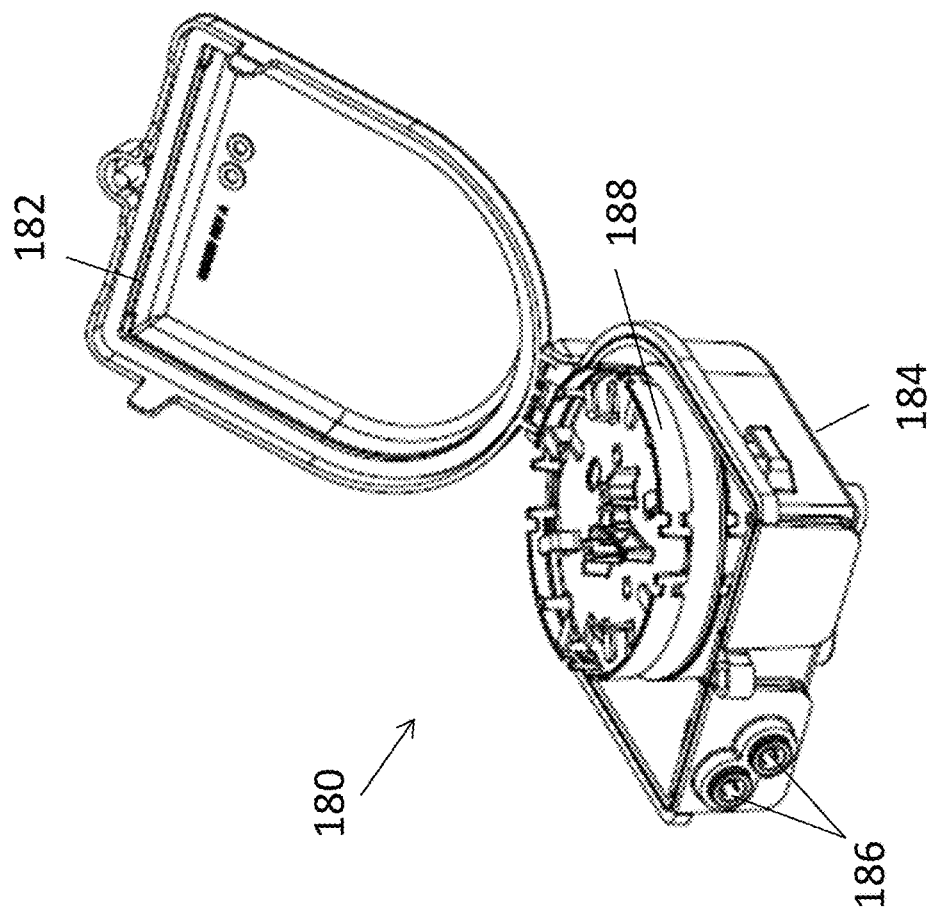
FIG. 11 is a perspective view of one embodiment of a test access point (tap) box with a closed lid and an open lid according to aspects of the present disclosure.
Figure 11:
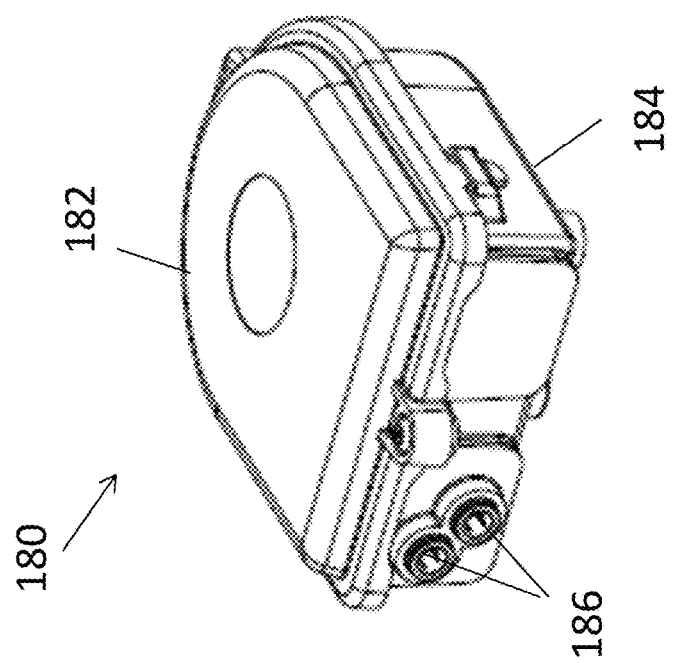

FIG. 11 is a perspective view of a test access point (tap) box 180 having a lid 182. The lid 182 may be closed or opened, as illustrated. The tap box 180 also includes a base 184 coupled to the lid 182. The tap box 180 includes a plurality of ports 186. The tap box 180 is also configured to include slack fiber storage 188 within its interior, as defined by the base 184 and the lid 182. The slack fiber storage 188 is shown to be coupled to the base 184. In other embodiments, the slack fiber storage 188 may be coupled elsewhere, for example, to the lid 182.

Figure 12:
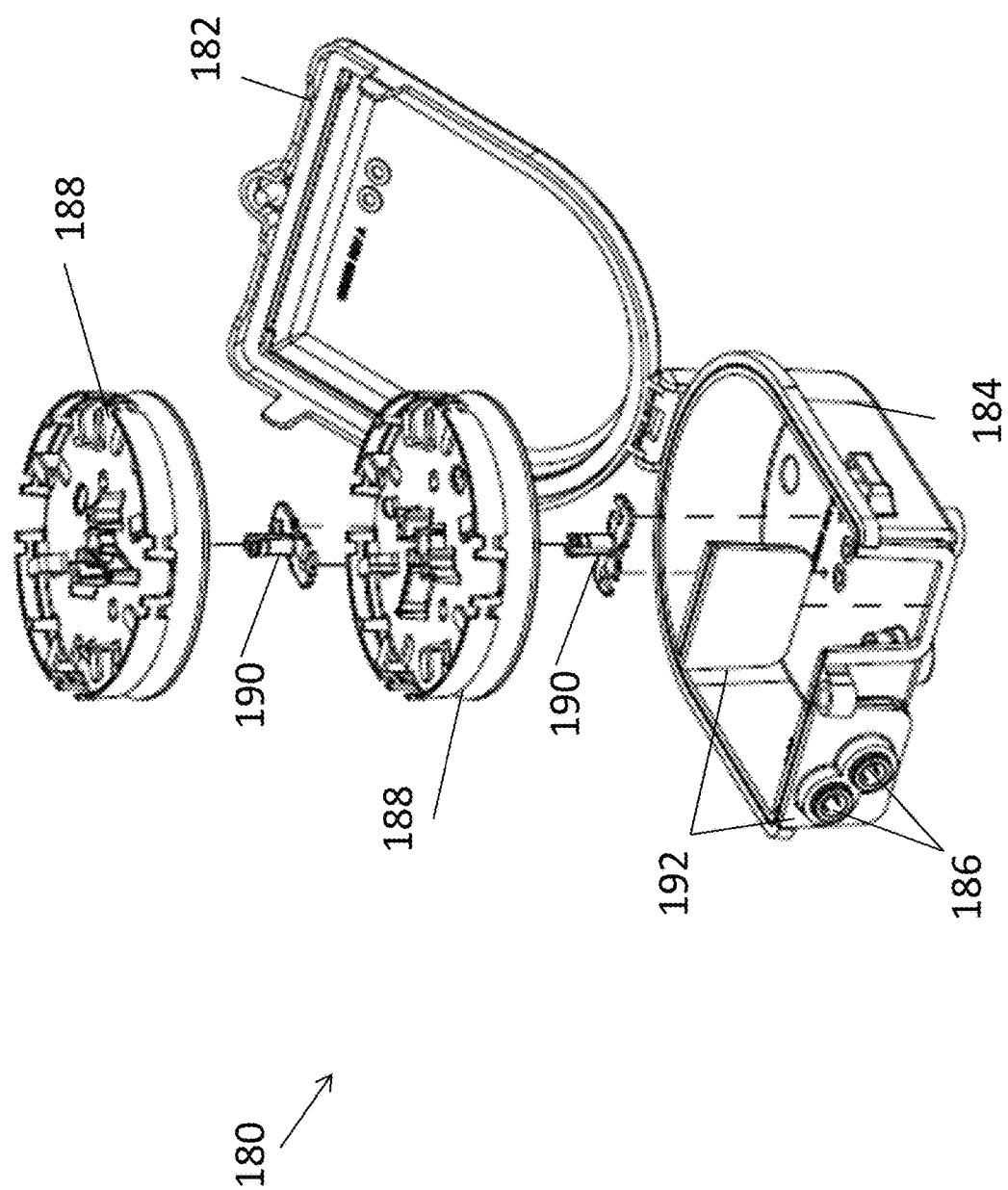
FIG. 12 is a perspective, partially exploded view of the tap box of FIG. 11 according to aspects of the present disclosure.

FIG. 12 is a perspective, partially exploded view of the tap box 180, showing a plurality of slack fiber storages 188. Each slack fiber storage 188 is coupled about its central axis to a respective mount 190. The bottom mount 190 is configured to couple to the base 184. The slack fiber storages 188 are configured as wheels. In this embodiment, there are two slack fiber storages 188. However, in other embodiments, the tap box may include one or more slack fiber storages. The tap box 180 further includes removable bulkheads 192.

Figure 13:
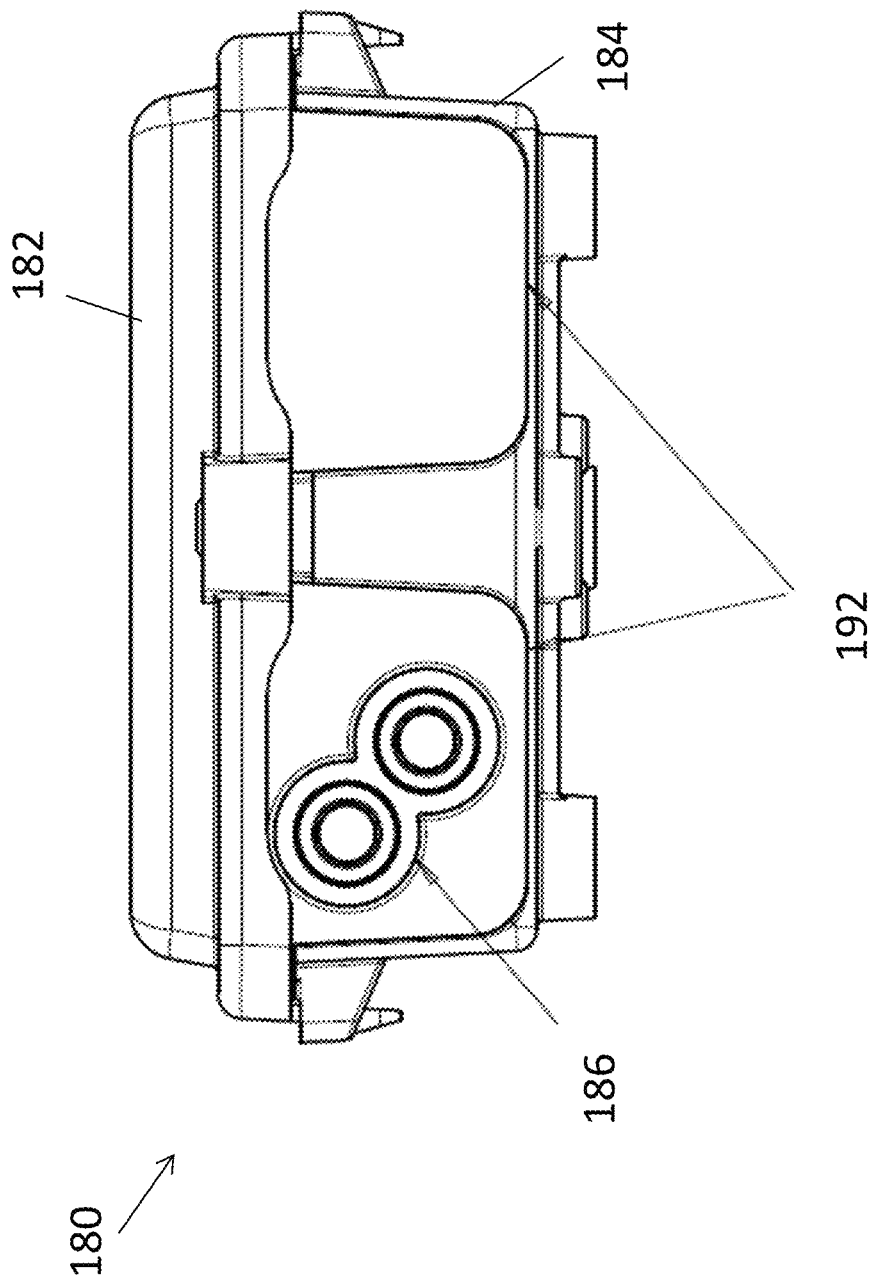
FIG. 13 is a side view of the tap box of FIG. 11 according to aspects of the present disclosure.
Figure 14:
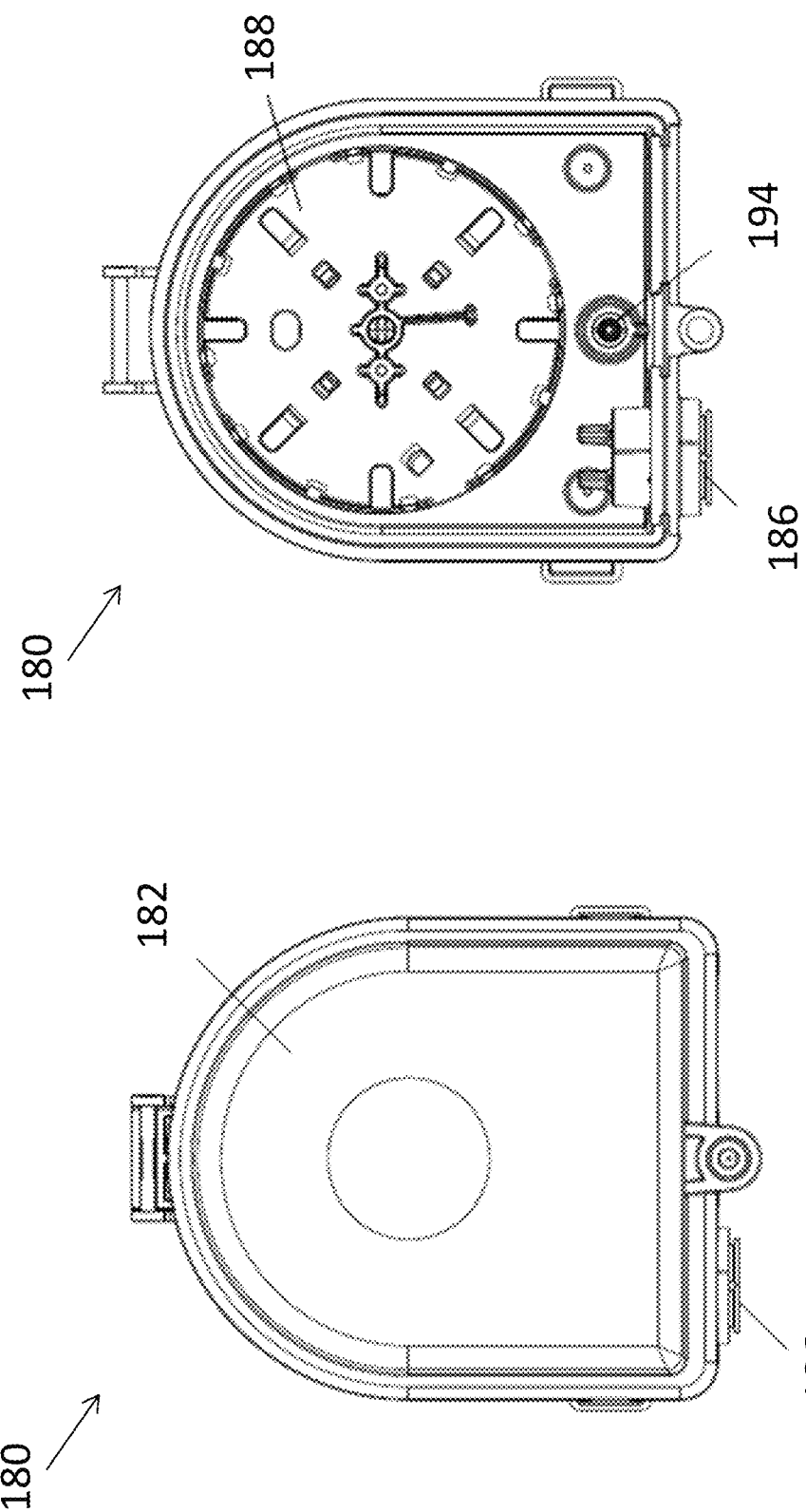
FIG. 14 is a top view of the tap box of FIG. 11, with a closed lid and an open lid according to aspects of the present disclosure.
Figure 15:
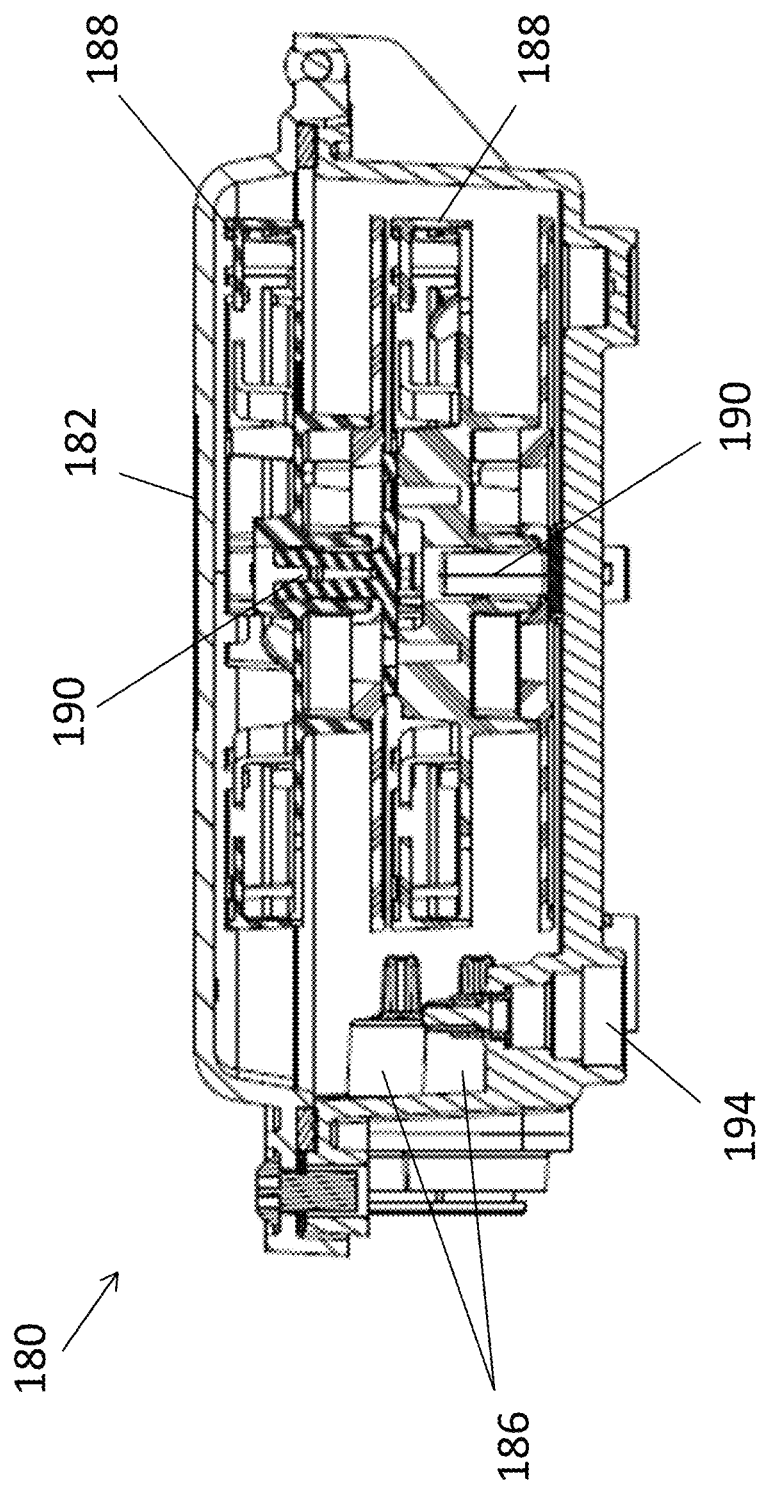
FIG. 15 is a cross-sectional side view of the tap box of FIG. 11 according to aspects of the present disclosure.

FIG. 13 is a side view of the tap box 180, showing the removable bulkheads 192, and further illustrating the ports 186. Each port 186 is a 10 mm sealed duct port with a breakoff cap and an anti-rotation locking feature. FIG. 14 shows top views of the tap box 180, with a closed lid 182 and an open lid exposing the slack fiber storage 188. As shown in FIG. 14, the tap box 140 also includes a 10 mm duct port 194 with a breakoff cap for passing through a wall. FIG. 15 is a cross-sectional side view of the tap box 180, illustrating the ports 186 and 194, as well as the slack fiber storages 188 and mounts 190.

Embodiments of the tap box may have a hinged removable cover design, making it easy for craft personnel to access the box during both initial service installation and ongoing maintenance. In some embodiments, slack fiber storages may include fiber reels that may be installed into tap boxes by snapping them onto a post bracket or mount that is mounted inside the box. Each post bracket or mount may have a built-in feature that locks the reels in place once the fiber has been pulled to the specified location.

In some embodiments, once mounted inside the box, reels may be deployed by using a pull string to pull fiber from the bottom reel back through the 10 mm duct and connect it to the distribution/access point. Bringing fiber to the inside of the customer location may be accomplished by using the top reel and pulling it to the desired location. In some embodiments, either 900 um fiber with a ducted pathway or 3 mm fiber may be used for this internal application.

Various embodiments of the tap box may be customizable and are flexible. In some embodiments, the tap box may be empty (for future fiber deployment). Various embodiments may include empty reels for slack fiber storage. In some embodiments, the tap box may include one, two or more fiber reels, each holding up to 300 feet of 900 um fiber. Various embodiments of tap boxes may provide multiple drop options. In some embodiments, one or more insertable/interchangeable cable entrance plates may be incorporated into the bottom of the box. The tap box may include a plate with couplers for bringing in one, two or more 10 mm duct or flat drop assemblies. A blank plate may allow configuring a tap box with multiple cable, duct and connector feed options into the tap box, and would allow various types of connectors to be installed. Some embodiments may include an access port on rear of box, which allows for direct fiber deployment into the customer location. Some embodiments of the tap box may include optional private labeling on the front cover to easily identify a service provider's identification. Various embodiments of tap boxes are designed for all environments. The tap box may have a gasketed cover, watertight duct fittings and may be made from impact and UV resistant PBT and PC material.

Various embodiments of the tap box may provide fiber terminations that are Telcordia and RUS compliant. Various embodiments of the tap box support industry standard SC single mode connectors. Various embodiments of the tap box have a small footprint. In one example, the tap box has dimensions of about 7.8 inches (height) by 6.25 inches (width) by 2.81 inches (depth).

Various embodiments of the tap box include a gasketed cover for protection from elements, and watertight connectors for sealing of duct. Some embodiments may include a pin in hex screw for reduced tampering. Some embodiments may be made of high-impact UV resistant thermal plastic material—to resist and withstand corrosive environments.

Various embodiments of the tap box are configured to accept multiple drop options for maximum flexibility. Some embodiments have a removable hinged cover to allow for easy access to closure. Some embodiments may include lockable pins to hold deploy reels or slack fiber storages in place once fiber is deployed. Some embodiments may be configured to include at least one of a wall mount and a pole mount. Some embodiments may include pre-terminated deploy reels, which minimizes splicing and connectorization field costs. In other embodiments, it is possible to add reels after the tap box has been installed.

Tap boxes may be configured to provide multiple drop options. One example of a drop option is the FieldShield Flat-SC. Flat drop connectivity in the last mile is a widely-used product and is a good solution for both direct buried and aerial drop applications. Various embodiments of the tap boxes may provide flat drop connectivity. Flat SC cable assemblies may be pre-terminated from the factory and are available in multiple lengths. Cable assemblies are placed and brought to a tap box, where the connector is snapped into place, for example on the bottom of the box, providing an air/water tight connection.

The FieldShield Flat-SC is the first connector to provide hardened environmental performance on a flat drop style cable without the added cost or dependency in the market's existing bulky solutions. Various embodiments of the flat cables disclosed herein are airtight and watertight. Various embodiments may be plugged directly into terminals disclosed herein, providing matching hardened connector performance, yet carrying a significant up-front reduction in costs when compared to existing market offerings. Some embodiments with factory installed connectors utilizing Clearfield® FiberDeep® technology guarantee 0.2 dB insertion loss or less, exceeding industry standards.

Flat cables disclosed herein, such as the Flat-SC cables may also be configured to fit into embodiments of tap boxes disclosed herein, utilizing the pre-terminated assembly for easy and reliable connections. For example, a 10 mm connector snaps into the receptacle providing an air-tight, water-tight connection between a tap box and a terminal.

Another drop cable option is the FieldShield D(ROP), a cable-in-conduit solution, referred to as a "restorable one pass" drop. FieldShield D(ROP) is a fiber pre-placed in a 7 mm diameter microduct. Rather than establish the route path of the duct and then push a pre-terminated drop to the customer as a second step, D(ROP) combines these two functions into one. D(ROP) includes a pre-terminated fiber that is already installed.

Various drop cable embodiments disclosed herein may be configured to guarantee an insertion loss of less than or equal to about 0.2 dB.

D(ROP) cable presents the same footprint as a flat drop cable. D(ROP) cable is restorable. Fiber cuts are located, repaired and a new fiber assembly is pulled from point A to B with a pre-terminated LC assembly. In the event that an LC is not used, blunt fiber may be pulled and completed with a fuse-on connector minimizing costs and time to restore the service outage. Plugged directly into embodiments of terminals and tap boxes disclosed herein, the D(ROP) cable provides a complete protection pathway from the access point directly to the premise, business or antenna with the option for restoration after accidental fiber cut. D(ROP) does not have the slack storage challenges that a flat drop presents because the duct slack can be peeled or removed leaving only the 900 um pre-terminated/tested fiber assembly.

Another drop cable option is the FLEXdrop, which provides all the same characteristics as a 3 mm pushable/pullable FieldShield Fiber, with increased flexibility and reduced jacket memory, providing better slack storage and routing while decreasing the risk of kinking. Cable can be routed, without protection of duct, into the inside premise through walls, stapled and/or applied using local contractor accepted practices. FLEXdrop can be used with a tap box and deploy reels for connectivity to the terminal as well as for final connectivity inside the premise at the ONT or fiber jack/demarcation. FieldShield FLEXdrop is typically used in conjunction FieldShield Microduct solutions. For example, FLEXdrop can be either pulled or pushed through microduct at turn-up, maximizing installation efficiency. In the event of a later fiber cut, the fiber can be easily pulled from microduct. The duct is then repaired and a n FieldShield Pushable Assembly is pushed or pulled through the microduct for a fast and cost-effective restoration. In other embodiments, the FLEXdrop does not require a duct or microduct. In some applications, the FLEXdrop cable may be stapled directly to walls and ceilings for singular applications.

Another drop cable option is the FieldShield Strong Fiber—a durable high tensile strength fiber when compared to other fibers of its size. StrongFiber is suitable for indoor and outdoor environments. Manufactured with premium bend-insensitive fiber, FieldShield StrongFiber offers high tensile strength to resist damage to the fiber during installation in the FieldShield Microducts. When terminated with a FieldShield pullable connector, the FieldShield StrongFiber can be quickly deployed, and in turn, reduces installation time drastically.

Another drop cable option is the FieldShield Pushable Optical Cable, a durable and crush resistant product that is suitable for most indoor or outdoor environments. Manufactured using PBT jacketing, pushable optical fiber offers flexibility as well as resistance to chemicals. While FieldShield Pushable Optical Fiber is typically used in conjunction with FieldShield Microduct solutions, it is strong enough to be stapled directly to walls and its bend insensitive fiber is flexible enough to go around 90 degree corners.

Various types of cables disclosed herein may be used in various embodiments of fiber distribution systems, and in conjunction with terminals, tap boxes and other components disclosed herein. In some embodiments, cables may be either pulled or pushed through microduct at turn-up, maximizing installation efficiency. In the event of a later fiber cut, the fiber can be easily pulled from microduct. The duct is then repaired and a new FieldShield Pushable Assembly is pushed or pulled through the microduct for a fast and cost-effective restoration.

In some embodiments, a cable, such as FLEXdrop, may be configured according to aspects of the present disclosure to support all industry standard connectors. The cable may be available in single mode. In some embodiments, a cable may include bend-insensitive (G.657.A2) fiber that protects optical signal with minimal to zero attenuation down to a 10 mm radius. In some embodiments, cables may include PVDF jacketing configured to provide high column strength and low coefficient of friction to maximize push and pull distances. In some embodiments, cables such as the FLEXdrop, may be Lightweight and highly crush resistant, making the FLEXdrop strong enough to be stapled directly t s, joists and around corners, with appropriate staples. Some embodiments of cables may be protected by water blocking Kevlar strength member. Tech-friendly 250 µm fiber inside 900 µm tube reduces splicing steps and installation costs. Various embodiments of cables disclosed herein may be suitable for all types of indoor and outdoor implementations. Various embodiments of cables are configured for pushing directly into a cassette, such as a module or cassette disposed within a terminal. Quick and easy deployment allows capital investment to be aligned to customer take rates.

In some embodiments, the cable may have a clad diameter of about 125.0±0.7 µm, Clad Non-circularity of less than or equal to 1 percent, core/clad concentricity error of less than or equal to about 0.5 µm maximum, and less than about 0.2 µm typically. The cable may have a coating diameter (uncolored) of about 235-245 µm, a coating-clad concentricity error (Offset) of less than or equal to about 12 µm, a tensile proof test of 100 kpsi (0.69 GPa), a coating strip force range of ≥0.3 lbf<2.0 lbf (≥1.3 N<8.9 N), and a cable spec of about 0.35 dB/km @ 1,310 nm and 0.25 dB/km @ 1,550 nm.

In some embodiments, a cable may include bend-insensitive fiber, may have a maximum spool length of about 20,000 feet, may include single or multiple fibers, may work with various types of pushable and standard connectors (e.g., Pushable Connectors FieldShield SC/UPC, SC/APC, Simplex LC/UPC, Simplex LC/APC, Standard Connectors SC/UPC, SC/APC, LC/UPC, LC/APC, FC/UPC, FC/APC, ST/UPC, HFOC SC/APC), may have a single mode, may have an internal fiber size of about 250 µm, may have an outside diameter of about 0.118 inches (3 mm), may be made of PVDF material, may have a bend-radius of about 10 mm minimum, may have an operating temperature of about −40° F. to about 176° F. (−40° C. to 80° C.), installation temperature of about −14° F. to about 158° F. (−26° C. to 70° C.), installation tension of 20 lbf for 3 mm, and 20 lbf for 4 mm.

Figure 16:
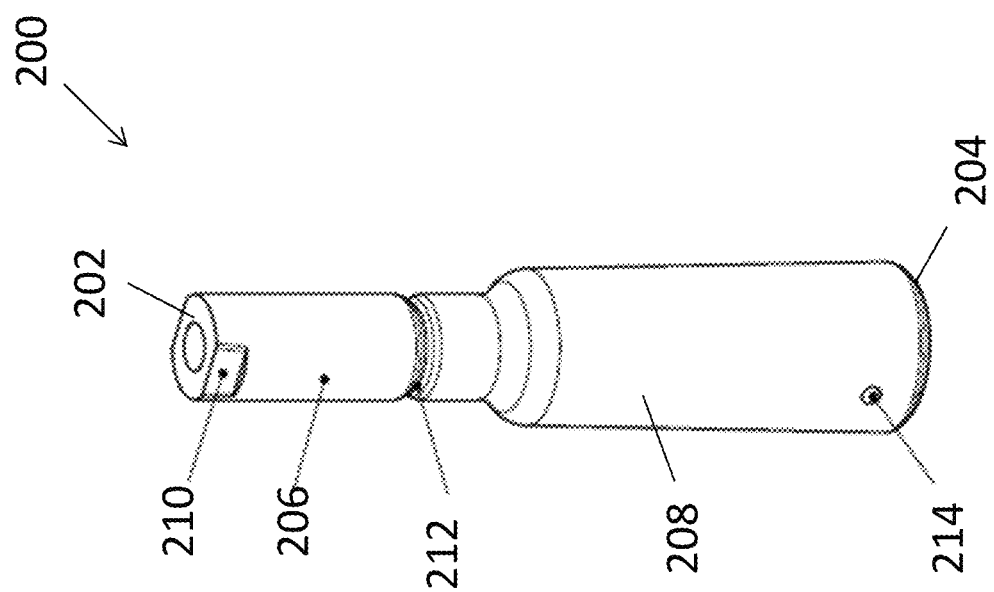
FIG. 16 is a perspective view of one embodiment of a connector configured according to aspects of the present disclosure.

FIG. 16 is a perspective view of one embodiment of a connector 200 configured according to aspects of the present disclosure. The connector 200 may be used in conjunction with the terminals and tap boxes disclosed herein. The connector 200 includes a first end 202 and a second end 204 opposite the first end. The connector 200 includes a first portion 206 having the first end 202 and a second portion 208 having the second end 204. The first portion 206 has a diameter different from that of the second portion 208. The diameter of the first portion 206 is sized for use with distribution ports of the terminals and tap boxes disclosed herein. The connector 200 has a snap ring feature 212 configured to couple the connector to a respective port, and an anti-rotation locking feature 210 configured to prevent rotation of the connector within the port. The anti-rotation locking feature 210 is configured to engage with the anti-rotation locking features of respective ports disposed within the terminals and tap boxes disclosed herein. The connector 200 also includes an epoxy hole 214 configured to receive epoxy, for example to seal the connector.

Figure 17:
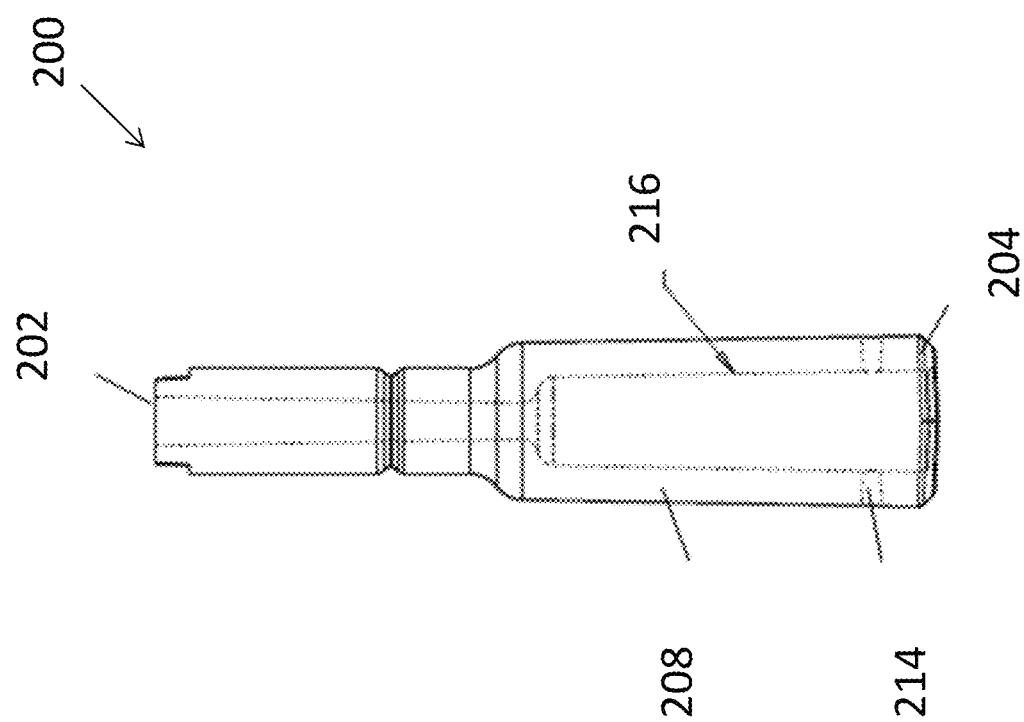
FIG. 17 is a side view of the connector of FIG. 16 according to aspects of the present disclosure.

FIG. 17 is a side view of the connector 200, further showing an interior cavity 216 for receiving epoxy. Epoxy may be added to the connector 200 via the epoxy hole 214 and used to seal the connector.

Figure 18:
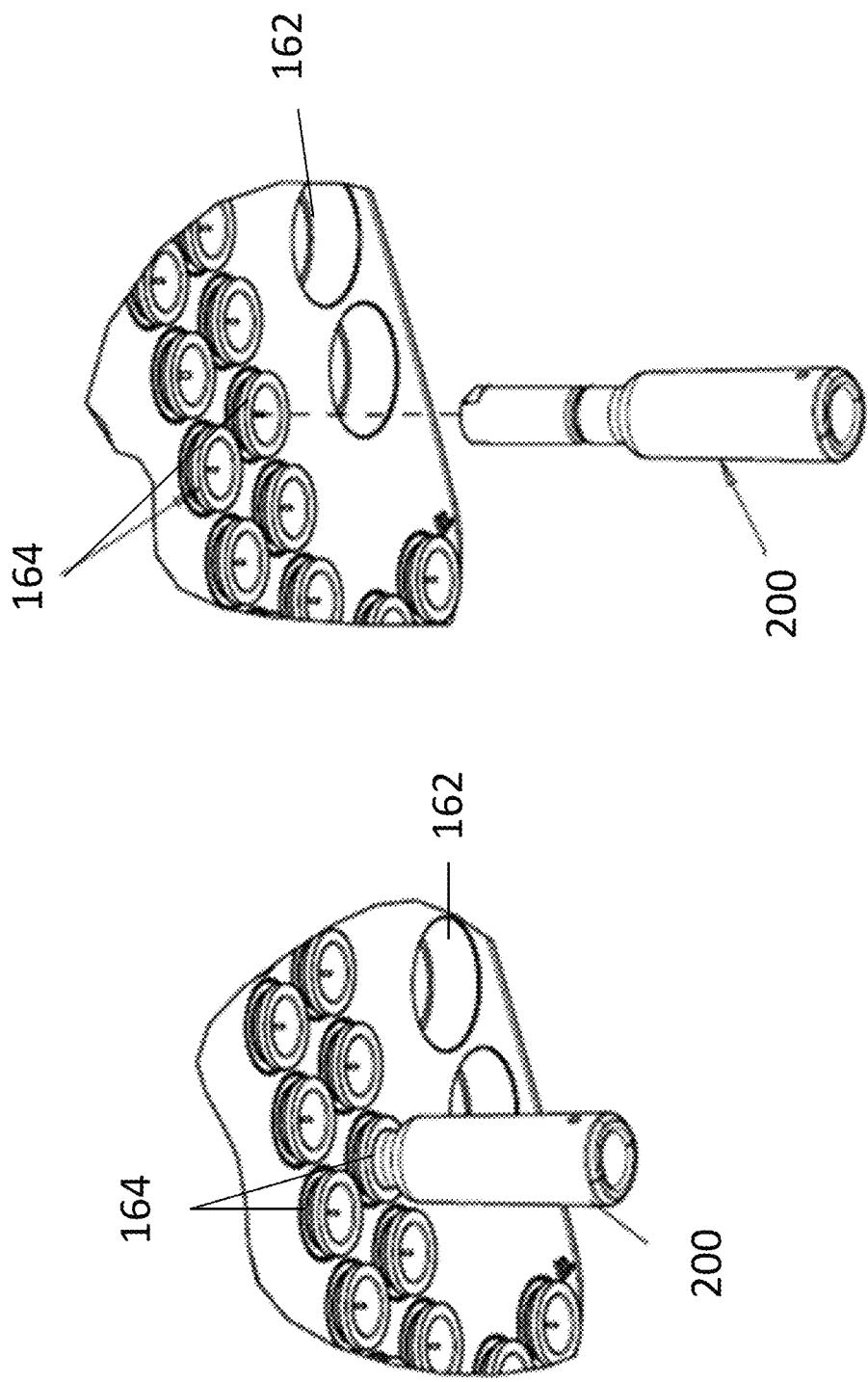
FIG. 18 is a perspective view of the connector of FIG. 16 being coupled to a distribution port of the terminal of FIG. 3 according to aspects of the present disclosure.

FIG. 18 is a perspective view of the connector 200 being coupled to a distribution port 164 of the terminal 150 according to aspects of the present disclosure. The connectors 200 may also be used in conjunction with ports of the tap boxes disclosed herein.

Figure 19:
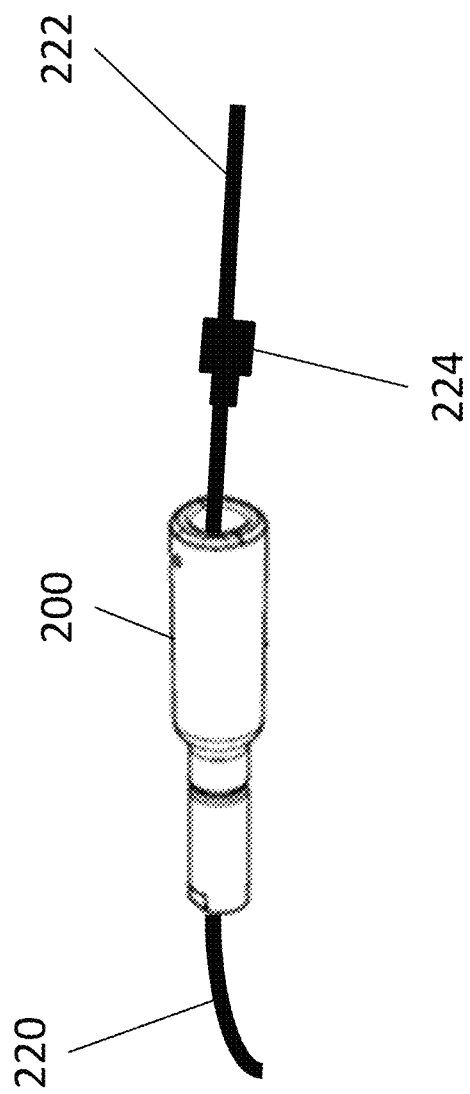
FIG. 19 is a perspective view of the connector of FIG. 16 receiving a cable according to aspects of the present disclosure.

FIG. 19 is a perspective view of the connector 200 receiving a first cable 220 and a second cable 222. The second cable 222 may be, for example, a drop cable to be supplied to an end user. In one embodiment, the first cable 220 may be a 3 mm cable. The second cable 222 may include a foam disk 224 configured as an epoxy stop. The connector 200 can include a key to be used with flat drop cable. The key can be used such that the flat drop cable cannot spin once inserted into the connector 200. In some embodiments, the connector 200 snap ring feature 212 can be used with a c-ring or other suspending bracket in an aerial application. The snap ring feature 212 may be employed when environmental sealing is not required. The snap ring feature 2121 can be positioned in other places along the body of the connector 200.

In embodiments of the invention, fiber inserted into the connector 200 is held in position but epoxy or other means of bonding, such as silicone or another sealant. The connector 200 can be of a different shape and size. The connector 200 can be keyed, bayonet style, pushable, threaded or otherwise clipped into position.

Figure 20:
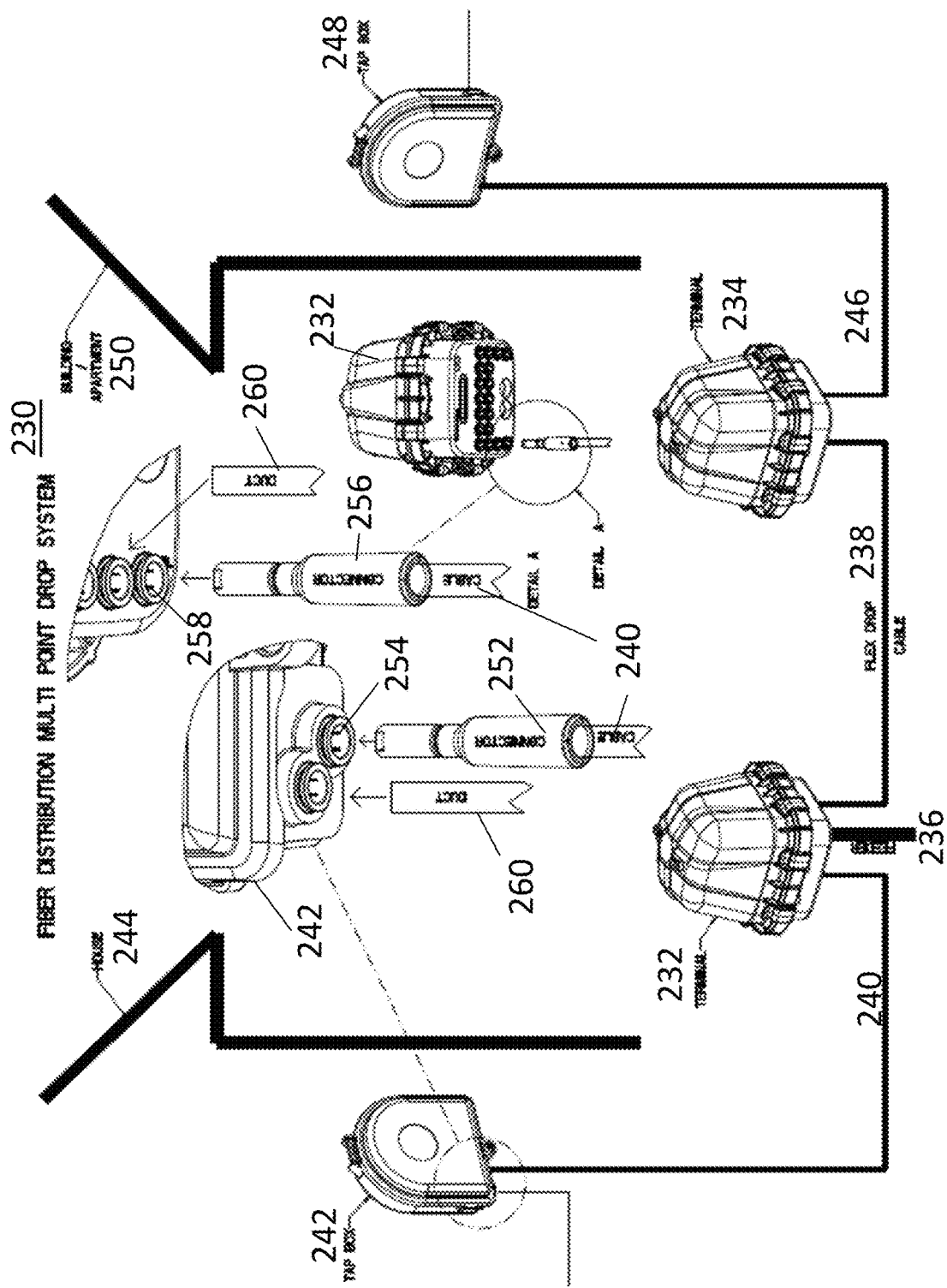
FIG. 20 is a schematic view of one embodiment of an optical fiber distribution system using terminals, tap boxes and connectors configured according to aspects of the present disclosure.

FIG. 20 is a schematic view of an optical fiber distribution multi-point drop system 230 using terminals, tap boxes and connectors configured according to aspects of the present disclosure. The fiber distribution system 230 includes a first terminal 232 and a second terminal 234. The first terminal 232 receives a feeder cable 236. A drop cable 238 emanates from the first terminal 232 and is received by the second terminal 234. Thus, the terminals 232 and 234 are coupled in system 230. Further, a second drop cable 240 emanates from the first terminal 232 and is received by the tap box 242, which is mounted on a house 244. A drop cable 246 emanates from the terminal 234 and reaches the tap box 248 mounted at a building or apartment 250.

Connector 252 is used to connect drop cable 240 to a port 254 of the tap box 242. Another connector 256 is used to connect the other end of the drop cable 240 to a distribution port 258 of the terminal 232. Various terminals and tap boxes disclosed herein may be configured to receive ducts or microducts. For example, FIG. 20 shows ducts 260 being inserted into the terminal 232 and the tap box 242. The fiber distribution system 230, and each of the terminals 232, 234, the tap boxes 242 and 248, and the various connectors 252, 256 illustrated in FIG. 20 may be configured according to any aspects disclosed herein. The system 230 is merely exemplary, and many other configurations of fiber distribution systems may be created using various components disclosed herein.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:
1. A fiber distribution system, comprising:
a terminal having at least one feeder port and a plurality of distribution ports, each of the at least one feeder port and the plurality of distribution ports being sealable ports, the terminal further comprising an expandable module configured to receive a splitter;
a tap box having at least one sealable port, the tap box further comprising at least one fiber storage; and
a connector comprising:
   a first portion having a first outer diameter and configured to be inserted into one of the plurality of distribution ports,
   a second portion having a second outer diameter greater than the first outer diameter and configured to receive a cable coupled to a disk configured as a stop, and
   an interior cavity extending from a first opening in the connector at the first portion to a second opening in the connector at the second portion, and
   a hole between the first opening and the second opening and in communication with the interior cavity to deliver epoxy to the interior cavity so as to provide a hardened connector and to hold the cable into position within the interior cavity by the epoxy;
wherein the terminal is configured to receive a fiber through the feeder port and to output a plurality of fibers through the plurality of distribution ports, at least one fiber of the plurality of fibers being received by the tap box through the sealable port of the tap box; and
wherein the terminal is a first terminal acting as a secondary feed source and the fiber distribution system further comprises a second terminal and a third terminal not coupled to the second terminal, each of the second terminal and the third terminal being configured to receive at least one fiber as a secondary feed from the first terminal.

2. The fiber distribution system of claim 1, wherein the module is configured to be replaceable and the first terminal is configured to receive a plurality of swappable modules.

3. The fiber distribution system of claim 1, wherein the module is configured to receive different types of splitters having different split ratios.

4. The fiber distribution system of claim 3, wherein the module is configured to receive at least one optical component.

5. The fiber distribution system of claim 1, wherein the sealable ports further include anti-rotation locking features.

6. The fiber distribution system of claim 1, wherein the first terminal comprises a base and a cover.

7. The fiber distribution system of claim 1, wherein the tap box comprises a plurality of slack fiber storages.

8. The fiber distribution system of claim 7, wherein the plurality of slack fiber storages are stackable and configured to provide slack storage of about 600 feet.

9. The fiber distribution system of claim 1, wherein the tap box includes removable bulkheads including at least one blank bulkhead configurable for receiving a connector.

10. The fiber distribution system of claim 1, wherein the tap box is configured to receive a plurality of different types of drop cables.

11. The fiber distribution system of claim 1, wherein the cable is a pushable drop cable, the interior cavity being configured to receive the pushable drop cable.

12. The fiber distribution system of claim 1, wherein each of the first terminal and the second terminal includes two feeder ports.

13. The fiber distribution system of claim 1, wherein the first terminal and the second terminal are arranged in a daisy chained configuration.

14. The fiber distribution system of claim 1, wherein the connector further comprises a snap ring feature at the first portion configured to snap the first portion of the connector into place in a port of the plurality of distribution ports to couple the connector to the port.

15. A fiber optic terminal comprising:
at least one feeder port;
a plurality of distribution ports, each of the plurality of distribution ports being a sealed port;
a connector comprising:
   a first portion having a first outer diameter and configured to be inserted into one of the plurality of distribution ports,
   a second portion having a second outer diameter greater than the first outer diameter and configured to receive a drop type cable coupled to a disk configured as a stop, and
   an interior cavity extending from a first opening in the connector at the first portion to a second opening in the connector at the second portion, and
   a hole between the first opening and the second opening and in communication with the interior cavity to deliver epoxy to the interior cavity so as to provide a hardened connector and to hold the drop type cable into position within the interior cavity by the epoxy; and
an expandable module configured to receive a splitter;
the terminal being configured to couple to a plurality of other terminals in a daisy chained configuration, wherein the terminal is configured to receive a plurality of fibers through the feeder port, to propagate a subset of said plurality of fibers to one of the other terminals, and to output at least one fiber through at least one of the plurality of distribution ports.

16. The fiber optic terminal of claim 15, wherein the module is configured to be replaceable and the terminal is configured to receive a plurality of swappable modules.

17. The fiber optic terminal of claim 15, wherein the module is configured to receive different types of splitters having different split ratios.

18. A fiber optic tap box, comprising:
a mount configured to attach the tap box to a user location;
at least one sealed port;
a connector comprising:
   a first portion having a first outer diameter and configured to be inserted into the at least one sealed port,
   a second portion having a second outer diameter greater than the first outer diameter and configured to receive a cable coupled to a disk configured as a stop, and
   an interior cavity extending from a first opening in the connector at the first portion to a second opening in the connector at the second portion, and
   a hole between the first opening and the second opening and in communication with the interior cavity to deliver epoxy to the interior cavity so as to provide a hardened connector and to hold the cable into position within the interior cavity by the epoxy; and
at least one slack fiber storage.

19. The fiber optic tap box of claim 18, wherein the at least one slack fiber storage is configured to provide about 600 feet of slack fiber storage.

* * * * *